US011463160B2

(12) United States Patent
Mendelsohn et al.

(10) Patent No.: US 11,463,160 B2
(45) Date of Patent: Oct. 4, 2022

(54) FLEXIBLE INTRA-SATELLITE SIGNAL PATHWAYS

(71) Applicant: ViaSat, Inc., Carlsbad, CA (US)

(72) Inventors: Aaron Mendelsohn, Carlsbad, CA (US); Donald Becker, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

(21) Appl. No.: 16/824,854

(22) Filed: Mar. 20, 2020

(65) Prior Publication Data
US 2020/0235807 A1    Jul. 23, 2020

Related U.S. Application Data

(63) Continuation of application No. PCT/US2017/053078, filed on Sep. 22, 2017.

(51) Int. Cl.
*H04B 7/185* (2006.01)
*H04B 7/204* (2006.01)

(52) U.S. Cl.
CPC ....... *H04B 7/18515* (2013.01); *H04B 7/2041* (2013.01)

(58) Field of Classification Search
CPC .......... H04B 7/18515; H04B 7/1851; H04B 7/2041; H01Q 3/30; H01Q 3/12; H01Q 3/34; H03F 3/68; H04W 88/04; H04J 1/10
See application file for complete search history.

(56) References Cited

U.S. PATENT DOCUMENTS 4,301,533 A * 11/1981 Acampora ................ H04L 1/22
370/318
4,381,562 A *  4/1983 Acampora ......... H04B 7/18523
370/323
(Continued)

FOREIGN PATENT DOCUMENTS

CN      101573894 A     11/2009
CN      104934675 A      9/2015
(Continued)

OTHER PUBLICATIONS

Bhardwaj (Multihop Machine-to-Machine (M2M) communication) (IDS-D3),Jul. 3, 2017 (Year: 2017).*
(Continued)

*Primary Examiner* — Wen W Huang
(74) *Attorney, Agent, or Firm* — Murphy, Bilak & Homiller, PLLC

(57) ABSTRACT

Systems and methods are described for enabling flexible signal pathways within a satellite of a satellite communications system. For example, a pathway selection subsystem in a bent-pipe satellite enables a flexible arrangement of non-processed signal pathways that couple uplink antenna ports with downlink antenna ports via uplink and downlink pathway selectors. The pathway selectors can be dynamically reconfigured (e.g., on orbit), so that the configuration of the pathway selectors at one time can form one set of signal pathways between respective uplink and downlink antenna ports, and the configuration at another time can form a different set of signal pathways between respective uplink and downlink antenna ports. The pathway selection subsystem can have a simulcast mode which, when active, couples each of at least one of the uplink antenna ports with multiple of the user downlink antenna ports to form one or more simulcast signal pathways.

15 Claims, 11 Drawing Sheets

(56) References Cited

U.S. PATENT DOCUMENTS

| | | | |
|---|---|---|---|
| 8,004,356 B2 | 8/2011 | Couchman et al. | |
| 8,103,225 B2 | 1/2012 | Couchman et al. | |
| 8,401,467 B2 | 3/2013 | Miller | |
| 8,451,172 B2 | 5/2013 | Angeletti | |
| 8,494,445 B2 | 7/2013 | Miller | |
| 8,805,275 B2 | 8/2014 | O'Neill et al. | |
| 9,252,869 B2 | 2/2016 | Gayrard et al. | |
| 9,680,559 B1 | 6/2017 | Freedman et al. | |
| 2003/0017803 A1* | 1/2003 | Rubin | H04B 7/18519 455/12.1 |
| 2003/0134592 A1 | 7/2003 | Franzen | H04B 7/18519 455/12.1 |
| 2010/0156528 A1* | 6/2010 | Couchman | H03F 1/0205 330/124 R |
| 2010/0271121 A1* | 10/2010 | Jones | H03F 3/602 330/124 D |
| 2011/0102263 A1* | 5/2011 | Angeletti | H01Q 25/00 342/373 |
| 2012/0319771 A1* | 12/2012 | Moon | H03F 3/45183 330/84 |
| 2013/0070666 A1 | 3/2013 | Miller et al. | |
| 2013/0148570 A1* | 6/2013 | Miller | H04W 88/04 370/316 |
| 2014/0092804 A1 | 4/2014 | Scott | |
| 2015/0295637 A1* | 10/2015 | Charrat | H04J 1/08 370/316 |
| 2015/0349421 A1 | 12/2015 | Sharawi | |
| 2017/0026961 A1* | 1/2017 | Hahn, III | H04B 7/2615 |
| 2017/0155444 A1* | 6/2017 | Patel | H04W 40/16 |
| 2017/0229765 A1* | 8/2017 | Vaddiparty | H04B 7/18515 |
| 2018/0227043 A1* | 8/2018 | Dankberg | H04B 7/2041 |
| 2018/0316417 A1* | 11/2018 | Motoyoshi | H04B 7/18523 |
| 2019/0058672 A1* | 2/2019 | Scott | H04B 7/18515 |

FOREIGN PATENT DOCUMENTS

| | | |
|---|---|---|
| JP | 2012511852 A | 5/2012 |
| JP | 2013509124 A | 3/2013 |
| JP | 2013098782 A | 5/2013 |
| JP | 2014524677 A | 9/2014 |
| RU | 2316130 C2 | 1/2008 |
| WO | 2008116075 A1 | 9/2008 |
| WO | 2011096646 A2 | 8/2011 |
| WO | 2014030904 A1 | 2/2014 |
| WO | 2014056317 A1 | 4/2014 |
| WO | 2015086810 A1 | 6/2015 |
| WO | 2017023621 A1 | 2/2017 |
| WO | 2017124004 A1 | 7/2017 |

OTHER PUBLICATIONS

Morlet, Catherine et al. "Satellite Communications for Air Traffic Management" European Space Agency,The Netherlands, KA and Broadband Communication Conference, 2013.

Balling P., C. et al. "Shaped Single-Feed-Per-Beam Multibeam Reflector Antenna" 2006 First European Conference on Antennas and Propagation, Nice, 2006, pp. 1-6, doi: 10.1109/EUCAP.2006.4584485.

International Preliminary Report on Patentability issued in International Application No. PCT/US2017/053078, dated Mar. 24, 2020 in 13 pages.

Bhardwaj Krit Karan Singh et al. "Different Network Coding Techniques for multihop Machine-to-Machine (M2M) Communication in Next Generation Smart Environment" 2017 IEEE International Conference on Advanced Intelligent Mechatronics (AIM), IEEE Jul. 3, 2017, pp. 142-147, doi: 10.1109/AIM.2017.8014009.

Lui, Kai et al. "Fault-tolerant Cell Dispatching for Onboard Space-memory-memory Clos-network Packet Switches" 2015 IEEE 16th International Conference on High Performance Switching and Routing (HPSR), IEEE Jul. 1, 2015, pp. 1-6, doi: 10.1109/HPSR.2015.7483090.

International Application No. PCT/US2017/053078, International Preliminary Report on Patentability dated Apr. 2, 2020, 13 pages.

International Application No. PCT/US2017/053078, International Search Report and Written Opinion dated Jul. 17, 2018, 17 pages.

International Application No. PCT/US2017/053078, Invitation to Pay Additional Fees and, Where Applicable, Protest Fee dated May 24, 2018, 12 pages.

Bhardwaj, et al., Different Network Coding Techniques for Multihop Machine-to-machine (M2M) Communication in Next Generation Smart Environment, Institute of Electrical and Electronics Engineers International Conference on Advanced Intelligent Mechatronics, Jul. 3-7, 2017, pp. 142-147.

Liu, et al., Fault-Tolerant Cell Dispatching for Onboard Space-Memory-Memory Clos-Network Packet Switches, Institute of Electrical and Electronics Engineers, 16th International Conference on High Performance Switching and Routing, 2015, 6 pages.

\* cited by examiner

FLEXIBLE INTRA-SATELLITE SIGNAL PATHWAYS

FIELD

Embodiments relate generally to satellite communications systems, and, more particularly, to flexible signal pathways within a satellite in a satellite communications system.

BACKGROUND

A satellite communications system typically includes a satellite (or multiple satellites) that provides connectivity between user terminals and gateway terminals located in coverage areas illuminated by the satellite's beams. The gateway terminals can provide an interface with other networks, such as the Internet or a public switched telephone network. Continuing to satisfy ever-increasing consumer demands for data can involve designing satellite communications systems with higher throughput (e.g., data rates of one Terabit per second or more), more robustness, and more flexibility. For example, gateway outages, weather conditions, changes in demand over time, and other conditions can impact how available satellite resources are translated into provision of communications services over time. Accordingly, fixed satellites designs (e.g., fixed allocation of resources across beams, fixed association between gateways and the user beams they service, fixed signal pathways through the satellite, etc.) can tend to yield inefficient, or otherwise sub-optimal, exploitation of available spectrum and other satellite resources.

BRIEF SUMMARY

Among other things, systems and methods are described for enabling flexible signal pathways within a satellite of a satellite communications system. Some embodiments operate in context of a bent-pipe satellite that illuminates user and gateway coverage areas with fixed spot beams. As an illustrative implementation, the satellite includes one or more antennas that have gateway uplink antenna ports, user uplink antenna ports, gateway downlink antenna ports, and user downlink antenna ports. For example, a group of user terminals in a particular fixed beam coverage area transmit return-link uplink signals that are received via user uplink antenna ports of the satellite, and the group of user terminals receive forward-link downlink signals that are transmitted via user downlink antenna ports of the satellite.

A pathway selection subsystem in the satellite includes a flexible arrangement of non-processed signal pathways that couple the uplink antenna ports with the downlink antenna ports via uplink pathway selectors and downlink pathway selectors. For example, the particular configuration of the uplink and downlink pathway selectors at one time can effectively form a corresponding set of signal pathways between respective uplink and downlink ports of the antenna(s), and the configuration can be dynamically reconfigured (e.g., on orbit) at another time to form a different corresponding set of signal pathways. The pathway selection subsystem has forward and/or return simulcast modes, which, when active, can couple each of at least one of the uplink antenna ports with multiple of the downlink antenna ports to form one or more simulcast signal pathways. For example, in the forward simulcast mode, a single gateway uplink signal from a single gateway beam can be simulcast as multiple user downlink signals to multiple user beams.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

Figure 1:
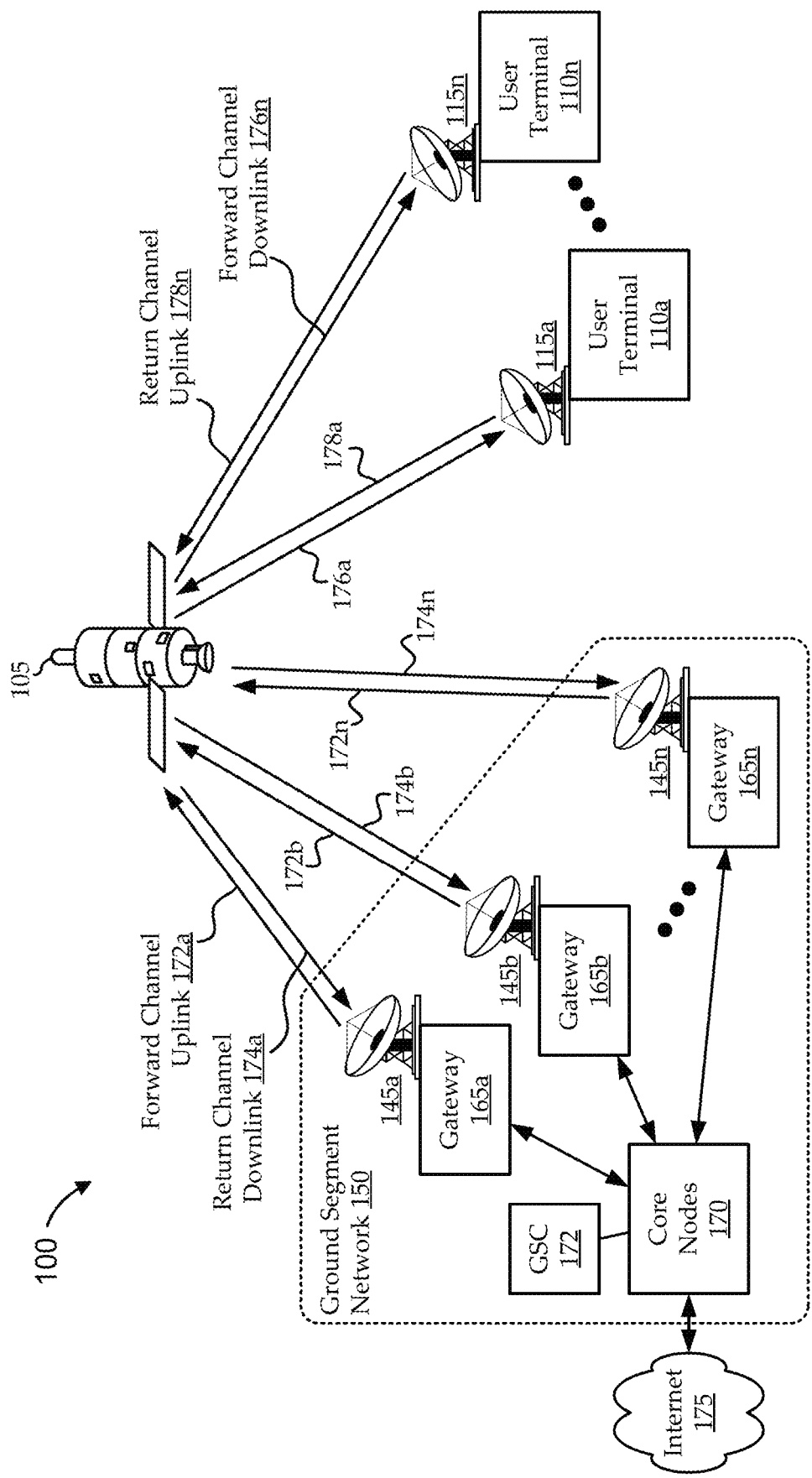
FIG. 1 shows a block diagram of an embodiment of a satellite communications system, according to various embodiments.

Turning first to FIG. 1, a block diagram is shown of an embodiment of a satellite communications system 100, according to various embodiments. The satellite communications system 100 includes a ground segment network 150 in communication with multiple user terminals 110 via a space segment (one or more satellites 105). The ground segment network 150 can include any suitable number of ground terminals. The term "ground" is used herein to generally include portions of the network not in "space." For example, embodiments of the ground terminals can include mobile aircraft terminals and the like. The ground terminals can include gateway terminals 165, core nodes 170, network operations centers (NOCs), satellite and gateway terminal command centers, and/or any other suitable nodes. While user terminals 110 can be part of the ground segment network 150 of the satellite communications system 100, they are discussed separately herein for the sake of clarity. Though not shown, each user terminal 110 can be connected to various consumer premises equipment (CPE) devices, such as computers, local area networks (e.g., including a hub or router), Internet appliances, wireless networks, and the like. In some implementations, user terminals 110 include fixed and mobile user terminals 110.

Some embodiments are implemented as a hub-spoke architecture, in which all communications pass through at least one gateway terminal 165. For example, a communication from a first user terminal 110 to a second user terminal 110 can pass from the first user terminal 110 to a gateway 165 via the satellite 105, and from the gateway 165 to the second user terminal 110 via the satellite 105. Accordingly, communications can be considered as coming from a gateway terminal 165 or going to a gateway terminal 165. Other embodiments can be implemented in other architectures, including, for example, architectures permitting communications from a user terminal 110 to itself (e.g., as a loopback communication) and/or to one or more other user terminals 110 without passing through a gateway terminal 165.

Communications coming from one or more gateway terminals 165 are referred to herein as "forward" or "forward-link" communications, and communications going to one or more gateway terminals (e.g., from user terminals 110) are referred to herein as "return" or "return-link" communications. Communications from the ground (e.g., gateway terminals 165 and user terminals 110) to space (e.g., the satellite 105) are referred to herein as "uplink" communications, and communications to the ground from space are referred to herein as "downlink" communications. In that parlance, the gateway terminals 165 can communicate to the satellite 105 over a forward uplink channel 172 via one or more gateway antennas 145 and can receive communications from the satellite 105 over a return downlink channel 174 via the one or more gateway antennas 145; and the user terminals 110 can communicate to the satellite 105 over a return uplink channel 178 via their user antennas 115 and can receive communications from the satellite 105 over a forward downlink channel 176 via their user antennas 115.

The gateway terminal 165 is sometimes referred to as a hub or ground station. While the gateway terminals 165 are typically in fixed locations, some implementations can include mobile gateways. The ground segment network 150 can distribute ground segment functionality among various components. For example, geographically distributed core nodes 170 are in communication with the Internet 175 (and/or other public and/or private networks) and with each other via a high-speed, high-throughput, high-reliability terrestrial backbone network. The core nodes 170 have enhanced routing, queuing, scheduling, and/or other functionality. Each gateway terminal 165 is in communication with one or more core nodes 170 (e.g., redundantly). Groups of user terminals 110 are serviced by multiple gateway terminals 165 via the satellite 105 and user beams. Accordingly, return-link communications from a user terminal 110 destined for the Internet can be communicated from the user terminal to the satellite 105 via a user beam, from the satellite 105 to multiple gateway terminals 165 via respective gateway beams, from the gateway terminals 165 to one or more core nodes 170 via the ground segment network 150, and from the one or more core nodes 170 to the Internet 175 via a backbone network. Similarly, forward-link communications to a user terminal from the Internet can arrive at a core node 170 via the backbone network, be distributed to one or more gateway terminals 165 via the ground segment network 150, and be communicated from the one or more gateway terminals to the user terminal 110 via the satellite 105.

Though illustrated as the Internet 175, the ground segment network 150 can be in communication with any suitable type of network, for example, an IP network, an intranet, a wide-area network (WAN), a local-area network (LAN), a virtual private network (VPN), a public switched telephone network (PSTN), a public land mobile network, and the like. The network can include various types of connections, like wired, wireless, optical or other types of links. The network can also connect ground segment network 150 components to each other and/or with other ground segment networks 150 (e.g., in communication with other satellites 105).

In some embodiments, the gateway terminals 165 are in communication with a ground scheduling controller (GSC) 172. The GSC 172 can be implemented as one of the core nodes 170, as port of one or more gateway terminals 165, or otherwise as part of the ground segment network 150. Embodiments of the GSC 172 can provide ground-based support for various features of the satellite 105 described herein. For example, some embodiments of the GSC 172 can schedule forward-link traffic to the user terminals 110 by scheduling which traffic is sent to which gateway terminals 165 at which times in accordance with a pathway selection schedule (e.g., known by both the GSC 172 and the satellite 105). The GSC 172 can generate the scheduling information to allocate capacity over the satellite 105 coverage are, for example, by accounting for ground terminal geography (e.g., geographic locations of gateway terminals 165 and user terminals 110), beam capacity (e.g., the amount of traffic being sourced or sinked by each beam), and/or other factors. In some cases, the GSC 172 can determine and implement the scheduling to achieve certain objectives, such as flexibly allocating forward-link and return-link capacity, flexibly allocating monocast and simulcast capacity, etc. Such scheduling can also include determining which traffic can be simulcast (e.g., for concurrent transmission over multiple downlink beams), and scheduling the traffic, accordingly. As described herein, embodiments of the satellite 105 can implement dynamic pathway reconfiguration by generating control signals that reconfigure pathway selectors (e.g., switches), channel filters, frequency converters, and/or other components of the signal pathways; and some embodiments of the GSC 172 can generate and communicate those control signals to the satellite 105 (e.g., or otherwise provide information to the satellite 105 by which the satellite 105 can derive those control signals). Some examples of techniques for generating such scheduling information and implementing such scheduling in a satellite communications system are described in U.S. Pat. No. 8,542,629, granted to ViaSat, Inc., titled "Interference management in a hub-spoke spot beam satellite communication system," which is hereby incorporated by reference for all purposes.

The satellite 105 can support a number of spot beams that together provide a large coverage area for all the user terminals 110 and gateway terminals 165. Different carrier frequencies, polarizations, and/or timing can be used to mitigate interference between the beams and/or to facilitate frequency reuse. In some embodiments, the satellite 105 illuminates coverage areas with fixed spot beams. For example, the satellite 105 is designed, so that each spot beam has a fixed size (e.g., fixed beam width, fixed 3 dB cross-section with respect to the Earth, etc.) and illuminates a fixed geographical region of the Earth. Each gateway antenna 145 and user antenna 115 can include a reflector with high directivity in the direction of the satellite 105 and low directivity in other directions. The antennas can be implemented in a variety of configurations and can include features, such as high isolation between orthogonal polarizations, high efficiency in the operational frequency bands, low noise, and the like. In one embodiment, a user antenna 115 and a user terminal 110 together comprise a very small aperture terminal (VSAT) with the antenna 115 having a suitable size and having a suitable power amplifier. In other embodiments, a variety of other types of antennas 115 are used to communicate with the satellite 105. Each antenna can point at the satellite 105 and be tuned to a particular carrier (and/or polarization, etc.). The satellite 105 can include one or more fixed-focus directional antennas for reception and transmission of signals. For example, a directional antenna includes a fixed reflector with one or more feed horns for each spot beam. Other embodiments of the satellite 105 can be implemented with steerable beams (e.g., antennas that can be repointed on orbit using gimbals), beamformers, de-focused beams, and/or other types of beams.

As used herein, a beam feed can refer to a single feed element, or generally to any suitable antenna element or group of elements (e.g., a feed horn, a cluster of antenna feeds, etc.) for generating and/or forming spot beams. Each spot beam can refer to any suitable type of beam (e.g., focused spot beam, steerable beam, etc.) that provides uplink communications and/or downlink communications. In practice, uplink and downlink beams can be generated by separate feeds, groups of feeds, different port configurations, and/or in any other suitable manner. In one implementations, in a geographic region (e.g., a spot beam coverage area), user uplink beams communicate at a particular uplink frequency band (e.g., 27.5-30 Gigahertz), and user downlink beams communicate at a particular downlink frequency band (e.g., 17.7-20.2 Gigahertz) to avoid interference between return-channel uplink and forward-channel downlink traffic. In some implementations, gateway terminals 165 and/or user terminals 110 can have multiple antennas, tuning components, and other functionality that can support communications over different beams and/or at different frequencies, polarizations, etc. In certain implementations, different beams are associated with different transmit and/or receive powers, different carrier frequencies, different polarizations, etc. For example, a particular spot beam can have a fixed location and can support user uplink traffic, user downlink traffic, gateway uplink traffic, and gateway downlink traffic, each at different carrier/polarization combinations.

Contours of a spot beam, as generated by the satellite 105, can be determined in part by the particular antenna design and can depend on factors, such as location of feed horn relative to a reflector, size of the reflector, type of feed horn, etc. Each spot beam's contour on the earth can generally have a conical shape (e.g., circular or elliptical), illuminating a spot beam coverage area for both transmit and receive operations. A spot beam can illuminate terminals that are on or above the earth surface (e.g., airborne user terminals, etc.). In some embodiments, directional antennas are used to form fixed location spot beams (or spot beams that are associated with substantially the same spot beam coverage area over time). Certain embodiments of the satellite 105 operate in a multiple spot-beam mode, receiving and transmitting a number of signals in different spot beams. Each individual spot beam can serve a gateway terminal 165, a number of user terminals 110, both a gateway terminal 165 and a number of user terminals 110, etc. Each spot beam can use a single carrier (i.e., one carrier frequency), a contiguous frequency range (i.e., one or more carrier frequencies), or a number of frequency ranges (with one or more carrier frequencies in each frequency range). Some embodiments of the satellite 105 are non-processed (e.g., non-regenerative), such that signal manipulation by the satellite 105 provides functions, such as frequency translation, polarization conversion, filtering, amplification, and the like, while omitting data demodulation and/or modulation, error correction decoding and/or encoding, header decoding and/or routing, and the like.

Over time, there has been a sharp increase in user demand for data volume and speed, which has driven a sharp increase in demand for communications system resources, like bandwidth. However, a satellite communications system 100 typically has limited frequency spectrum available for communications, and gateway outages, weather conditions, changes in demand over time, and other conditions can impact how that limited spectrum is translated into provision of communications services over time. Various techniques can facilitate frequency re-use, such as by geographically separating gateway terminals 165 from user terminals 110, and/or by implementing spot beams to use the same, overlapping, or different frequencies, polarizations, etc. However, fixed satellites designs (e.g., fixed allocation of resources across beams, fixed association between gateways and the user beams they service, fixed signal pathways through the satellite, etc.) can tend to yield inefficient, or otherwise sub-optimal, exploitation of available spectrum and other satellite resources.

Embodiments of the satellite communications system 100 described herein are designed to support high throughput (e.g., data rates of one Terabit or more), while being robust and flexible. For example, the satellite 105 can communicate with particular gateway terminals 165 via particular gateway beams, and with particular user terminals 110 via particular user beams; but flexible intra-satellite pathways can couple the gateway and user beams in a manner that can be dynamically reconfigured on orbit. Such dynamic reconfiguration can provide robustness and flexibility by enabling flexible allocation of resources among gateway and user beams, by enabling flexible allocation of resources among forward-link and return-link communications, by enabling monocast and simulcast pathways, and/or in other ways.

Figure 2:
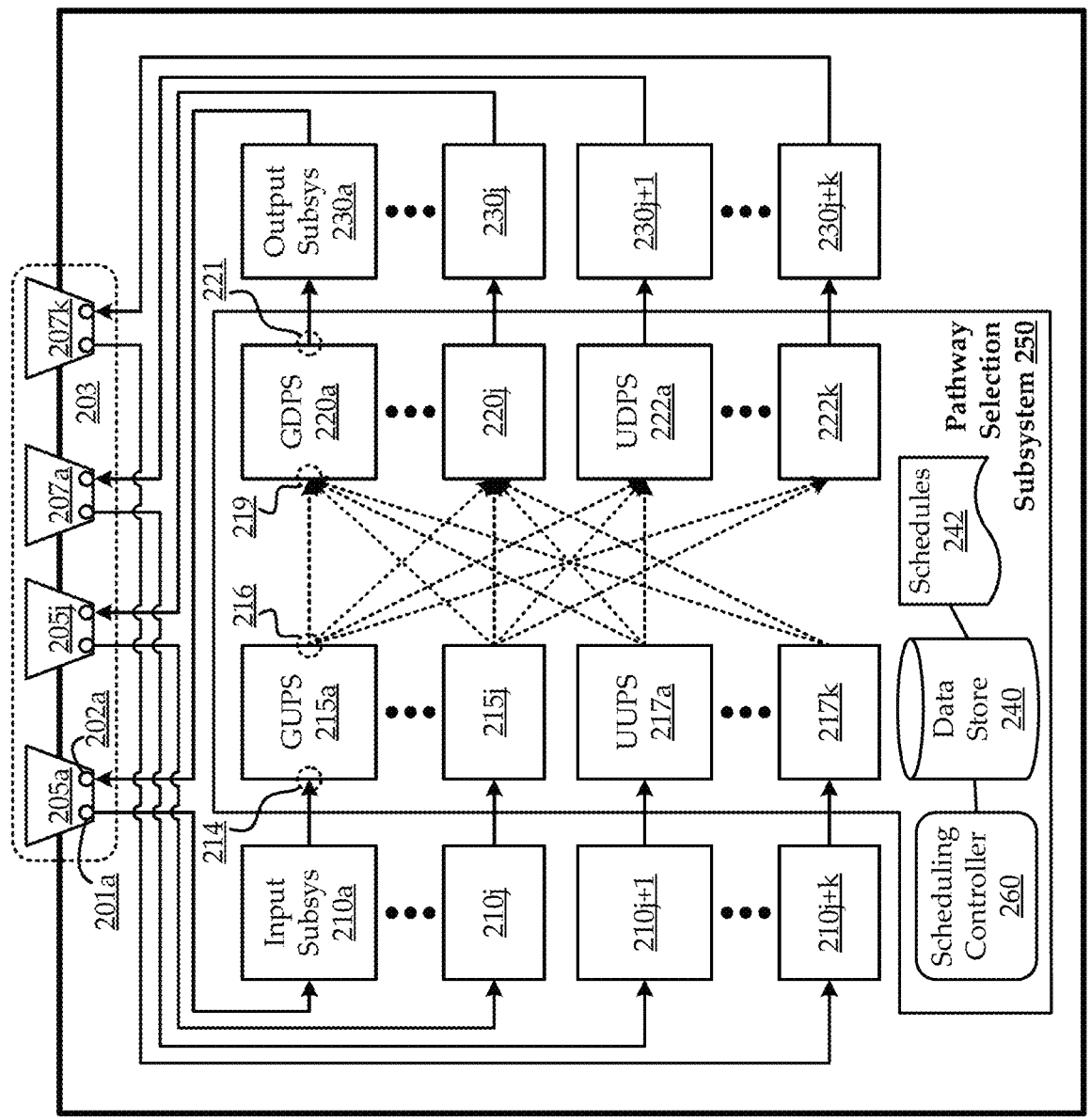
FIG. 2 shows a simplified block diagram of an illustrative satellite, according to various embodiments.

FIG. 2 shows a simplified block diagram of an illustrative satellite 200, according to various embodiments. The satellite 200 can be an implementation of the satellite 105 of FIG. 1. As illustrated, the satellite 200 includes an antenna subsystem 203 (e.g., a fixed spot beam antenna subsystem) having a number of gateway beam feeds 205 associated with gateway spot beams, and user beam feeds 207 associated with user spot beams. In general, each spot beam illuminates a spot beam coverage area, such that ground terminals located in the spot beam coverage area can communicate with the satellite 200 via the spot beam. Though certain beams, beam feeds, and other elements are referred to as "user" or "gateway," some implementations permit user terminals 110 to communicate via gateway beams and beam feeds, and/or permit gateway terminals 165 to communicate via gateway beams and beam feeds. The beam feeds can include uplink antenna ports 201 and downlink antenna ports 202. For example, each gateway beam feed 205 can include a gateway uplink antenna port and/or a gateway downlink antenna port, and each user beam feed 207 can include a user uplink antenna port and/or a user downlink antenna port. The term "port" or "antenna port" generally refers herein to any suitable interface with a beam feed that permits signal communications. The term "uplink antenna ports" can generally refer herein to gateway uplink antenna ports and/or user uplink antenna ports (e.g., in relation to forward-link and return-link signals, respectively), and the term "downlink antenna ports" can generally refer herein to gateway downlink antenna ports and/or user downlink antenna port (e.g., in relation to return-link and forward-link signals, respectively). As described above, feeds can generally refer to any suitable antenna element or group of elements. For the sake of simplicity, embodiments are described as using a particular beam feed to generate a corresponding spot beam, and the uplink antenna port 201 and downlink antenna port 202 of the beam feed support uplink and downlink traffic via the corresponding spot beam, respectively.

Embodiments of the satellite 200 further include input subsystems 210 and output subsystems 230 in communication via a pathway selection subsystem 250. The pathway selection subsystem 250 can include a number of gateway uplink pathway selectors (GUPSs) 215, gateway downlink pathway selectors (GDPSs) 220, user uplink pathway selectors (UUPSs) 217, and user downlink pathway selectors (UDPSs) 222. Each input subsystem 210 can be coupled between a respective uplink antenna port 201 and the pathway selection subsystem 250. For example, each of a first subset of input subsystems 210a-210j is coupled between a respective gateway uplink port and a respective GUPS 215, and each of a second subset of input subsystems 210j+1-210j+k is coupled between a respective user uplink port and a respective UUPS 217. Each output subsystem 230 can be coupled between the pathway selection subsystem 250 and a respective downlink antenna port. For example, each of a first subset of output subsystems 230a-230j is coupled between a respective gateway downlink port and a respective GDPS 220, and each of a second subset of output subsystems 230j+1-230j+k is coupled between a respective user downlink port and a respective UDPS 222.

The GUPSs 215, GDPSs 220, UUPSs 217, and UDPSs 222 can be coupled to each other in a reconfigurable manner. For example, each GUPS 215 can be selectively coupled with any one or more GDPSs 220 and/or UDPSs 222 at a time, and each UUPS 217 can be selectively coupled with any one or more GDPSs 220 at a time. In some implementations, each UUPS 217 (or only one or a portion of the UUPSs 217) can be selectively coupled with one or more GDPSs 220 and/or other UDPSs 222 at a time. In other implementations, each UUPSs 217 (or only one or a portion of the UUPSs 217) can be selectively coupled with one or more GDPSs 220 and/or the one UDPS 222 coupled to its corresponding user beam feed 207 (via a respective output subsystem 230). For example, UUPS 217a is illustrated as configurable to couple the user uplink port of user beam feed 207a to the user downlink port of user beam feed 207a via UDPS 222a.

The pathway selection subsystem 250 is designed to be reconfigurable in response to any suitable control input. Embodiments include a pathway scheduling controller 260 that directs reconfiguration of the pathway selection subsystem 250 by setting some or all of the pathway selectors (e.g., the GUPSs 215, GDPSs 220, UUPSs 217, and UDPSs 222) to form the non-processed signal pathways. For example, the pathway scheduling controller 260 can send control signals to switching components of the pathway selectors, and the switching components can be responsive to such control signals to cause the pathway selectors to couple particular inputs with particular outputs. The pathway configuration controller 260 can be implemented as a component in communication with the pathway selection subsystem 250, as part of the pathway selection subsystem 250, or in any other suitable manner. Embodiments of the pathway configuration controller 260 are implemented as one or more processors and can include, or be in communication with, a data store 240. The data store 240 can be implemented as any one or more suitable memory devices, such as a non-transient computer-readable medium. Some embodiments of the data store 240 can include instructions, which, when executed, can cause the pathway scheduling controller 260 (e.g., the one or more processors) to direct the reconfiguration of the pathway selection subsystem 250. As described herein, some embodiments of the data store 240 have, stored thereon, one or more pathway selection schedules 242 that define a particular configuration of the pathway selection subsystem 250 (e.g., of some or all of the non-processed signal pathways) for each of multiple timeframes. Embodiments of the pathway scheduling controller 260 can be used before and after the satellite 200 is deployed. For example, the pathway scheduling controller 260 can direct on-orbit reconfiguration of the pathway selection subsystem 250 (i.e., after the satellite 200 is deployed). The on-orbit reconfiguration can be performed according to pathway selection schedules 242 that were stored in the data store 240 prior to deployment of the satellite 200 and/or received by the satellite 200 and stored in the data store 240 after deployment.

In one embodiment, the pathway scheduling controller 260 can receive control information (e.g., from a gateway terminal via gateway uplink traffic), and the control information can indicate how and when to reconfigure the uplink pathway selectors and/or the downlink pathway selectors. The received control information can include, and/or can be used by the pathway scheduling controller 260 to derive, one or more pathway selection schedules 242, which can be stored in a data store 240 on the satellite 105. In some implementations, the control information is received on a control channel (e.g., as part of Telemetry, Tracking and Command (TT&C) signals received by the satellite). In other implementations, the control information is received from a gateway terminal via gateway uplink traffic, and the control information is tagged (e.g., using packet headers, preambles, or any other suitable technique) to be differentiable from other data in the forward-link traffic. Alternatively or additionally, one or more pathway selection schedules 242 can be stored on the data store 240 prior to deploying the satellite 200. For example, some embodiments can include stored pathway selection schedules 242 prior to deployment, and the stored pathway selection schedules 242 can be adjusted, updated, and/or replaced while the satellite 200 is on orbit.

The pathway selection schedules 242 can be generated in any suitable manner. For example, configurations can be defined with respect to a framed hub-spoke, beam-switched pathway access protocol having time slots, such as a Satellite Switched Time-Division Multiple Access (SS/TDMA) scheme. In such a protocol, a "slot" or "time slot" can refer to a smallest time division for switching, and a "frame" can refer to a set of slots (e.g., of predetermined length), such that pathway selection schedules 242 can define configurations of elements of the pathway selection subsystem 250 for each slot, each frame, etc. In some embodiments, during normal operation, continuous streams of frames are used to facilitate communications, and multiple terminals can be serviced during each time slot using multiplexing and multiple access techniques (e.g., Time-Division Multiplexing (TDM), Time-Division Multiple Access (TDMA), Frequency-Division Multiple Access (FDMA), Multi-Frequency Time-Division Multiple Access (MF-TDMA), Code-Division Multiple Access (CDMA), and the like). For example, a forward-link time slot can be divided into multiple "sub-slots" wherein transmissions to different user terminals or groups of user terminals are made in each sub-slot. Similarly, a return-link time slot may be divided into multiple sub-slots, which can be reserved for network control or signaling information (e.g., communication of scheduling information). Further, at any particular time according to the pathway selection schedule 242, the pathway selection subsystem 250 can be configured with monocast and/or simulcast signal pathways to enable additional flexibility. In some embodiments, multiple pathway selection schedules 242 can be used to handle particular circumstances, such as gateway terminal outages, periodic temporal changes in demand, etc.

As one example, in a first timeframe (e.g., a switching frame defined by a stored switching schedule), the pathway selection subsystem 250 is configured, such that there are active couplings between GUPS 215a and UDPS 222a, and between UUPS 217a and GDPS 220a (for the sake of simplicity, other active couplings are ignored). In this configuration, the pathway selection subsystem 250 includes a first non-processed forward signal pathway that provides connectivity between a first gateway beam and a first user beam, and a first non-processed return signal pathway that provides connectivity between the first user beam and the first gateway beam. For example, forward uplink traffic is received from a gateway terminal in the first gateway beam by an uplink port of gateway beam feed 205a; traverses the first non-processed forward signal pathway, including input subsystem 210a, GUPS 215a, UDPS 222a, and output subsystem 230j+1; and is transmitted as forward downlink traffic to user terminals in the first user beam from a downlink port of user beam feed 207a. Similarly, return uplink traffic is received from user terminals in the first user beam by an uplink port of user beam feed 207a; traverses the first non-processed return signal pathway, including input subsystem 210j+1, UUPS 217a, GDPS 220a, and output subsystem 230a; and is transmitted as return downlink traffic to the gateway in the first gateway beam from a downlink port of gateway beam feed 205a. In a second timeframe, the pathway selection subsystem 250 is reconfigured, such that there are active couplings between GUPS 215a and UDPS 222k, and between UUPS 217a and GDPS 220j (for the sake of simplicity, other active couplings are ignored). In this second configuration, the first forward and return non-processed signal pathways are no longer present. Instead, the pathway selection subsystem 250 includes a second non-processed forward signal pathway that provides connectivity between the first gateway beam and a second user beam, and a second non-processed return signal pathway that provides connectivity between the first user beam and a second gateway beam. For example, forward uplink traffic is received from a gateway terminal in the first gateway beam by an uplink port of gateway beam feed 205a; traverses the second non-processed forward signal pathway, including input subsystem 210a, GUPS 215a, UDPS 222k, and output subsystem 230j+k; and is transmitted as forward downlink traffic to user terminals in the second user beam from a downlink port of user beam feed 207k. Similarly, return uplink traffic is received from user terminals in the first user beam by an uplink port of user beam feed 207a; traverses the second non-processed return signal pathway, including input subsystem 210j+1, UUPS 217a, GDPS 220j, and output subsystem 230j; and is transmitted as return downlink traffic to a gateway in the second gateway beam from a downlink port of gateway beam feed 205j.

Embodiments of the pathway selection subsystem 250 include one or more simulcast modes. In some such embodiments, when a forward simulcast mode is active, the pathway selection subsystem 250 is configured to include at least one forward simulcast signal pathway that couples one of the gateway uplink antenna ports with multiple downlink antenna ports (e.g., multiple user downlink antenna ports). For example, such a configuration can provide simulcast connectivity between one gateway terminal and user terminals in multiple user beams. Such a configuration can provide a number of features. As one example, suppose the same data is being transmitted (e.g., broadcast) to user terminals in multiple user beams that are served by multiple different gateway terminals. In a conventional satellite system, such transmission may involve sending a copy of the data to each of the multiple gateway terminals, so that multiple copies traverse the satellite links to the multiple user beams. Using the forward simulcast mode described herein, a single copy of the data can be sent to a single gateway terminal, and a forward simulcast signal pathway can be used to simulcast the signal gateway uplink signal to multiple user beams.

In other such embodiments, when a return simulcast mode is active, the pathway selection subsystem 250 is configured to include at least one return simulcast signal pathway that couples one of the user uplink antenna ports with multiple downlink antenna ports. For example, such a configuration can provide simulcast connectivity between one user terminal and multiple gateway and/or user terminals in multiple beams. Some embodiments of the pathway selection subsystem 250 include simulcast modes that provide connectivity from multiple transmit beams to a single receive beam. In one such embodiment, the pathway selection subsystem 250 is configured to include at least one forward signal pathway that couples multiple gateway uplink antenna ports with a single user downlink antenna ports, thereby servicing users in a single user beam with gateways from multiple gateway beams. In another such embodiment, the pathway selection subsystem 250 is configured to include at least one return signal pathway that couples multiple user uplink antenna ports with a single gateway antenna ports, thereby using a single gateway to receive return-link communications from user terminals in multiple user beams. For example, each user uplink antenna port can receive a respective user uplink signal in a different respective frequency sub-range of a user uplink frequency range (i.e., where the sub-ranges do not overlap).

The elements of the pathway selection subsystem 250 can be implemented in any suitable manner for providing dynamically configurable non-processed signal pathways. In some embodiments, each uplink pathway selector (each GUPS 215 and UUPS 217) can include an uplink pathway selector input 214 coupled with a respective one of the uplink antenna ports (e.g., via a respective one of the input subsystems 210), and each downlink pathway selector (each GDPS 220 and UDPS 222) can include a downlink pathway selector output coupled with a respective one of the downlink antenna ports (e.g., via a respective one of the output subsystems 230). Each uplink pathway selector can also include multiple uplink pathway selector outputs 216, each downlink pathway selector can also include multiple downlink pathway selector inputs 221, and each uplink pathway selector output 216 is coupled with a respective one of the downlink pathway selector inputs 221 (e.g., directly or via an intermediate coupler, as described below). The couplings between the uplink pathway selector outputs 216 and the downlink pathway selector inputs 221 can be fixed, such that reconfiguration of signal pathways can involve activating and/or deactivating selected ones of the uplink pathway selector outputs 216 and downlink pathway selector inputs 221. As described more fully below, some embodiments implement the uplink pathway selectors and/or downlink pathway selectors as switches, such that activating a particular input or output involves switching to (or switching on) that input or output. Other embodiments implement the uplink pathway selectors or downlink pathway selectors as power dividers or power combiners, respectively, such that multiple inputs or outputs are concurrently activated and selective activation of a particular coupling involves switching or other suitable selection on the other side of the coupling.

As described more fully below, embodiments of the input subsystems 210 can include any suitable elements for facilitating receipt of uplink signals and/or for preparing the signals for handling by the pathway selection subsystem 250, and embodiments of the output subsystems 230 can include any suitable elements for facilitating transmission of downlink signals and/or for otherwise preparing the signals after handling by the pathway selection subsystem 250. For example, the input subsystems 210 and output subsystems 230 can include amplifiers, filters, converters, and/or other components. In various embodiments, frequency converters can be included in the input subsystems 210 and/or output subsystems 230. In one such embodiment, frequency converters in the input subsystems 210 convert received uplink signals from the uplink frequency band in which they are received to a downlink frequency band in which they are to be transmitted; and the conversion is performed prior to the pathway selection subsystem 250, such that the pathway selection subsystem 250 is designed to operate at the downlink frequency band. In another such embodiment, frequency converters in the output subsystems 230 convert received uplink signals from the uplink frequency band in which they are received to a downlink frequency band in which they are to be transmitted; and the conversion is performed after the pathway selection subsystem 250, such that the pathway selection subsystem 250 is designed to operate at the uplink frequency band. In yet another such embodiment, frequency converters in the input subsystems 210 convert received uplink signals from the uplink frequency band in which they are received to an intermediate frequency band (e.g., a frequency band below both the uplink and downlink frequency bands) prior to the pathway selection subsystem 250; and frequency converters in the output subsystems 230 convert uplink signals, after the pathway selection subsystem 250, from the intermediate frequency band to a downlink frequency band in which they are to be transmitted; such that the pathway selection subsystem 250 is designed to operate at the intermediate frequency band.

Figure 3A:
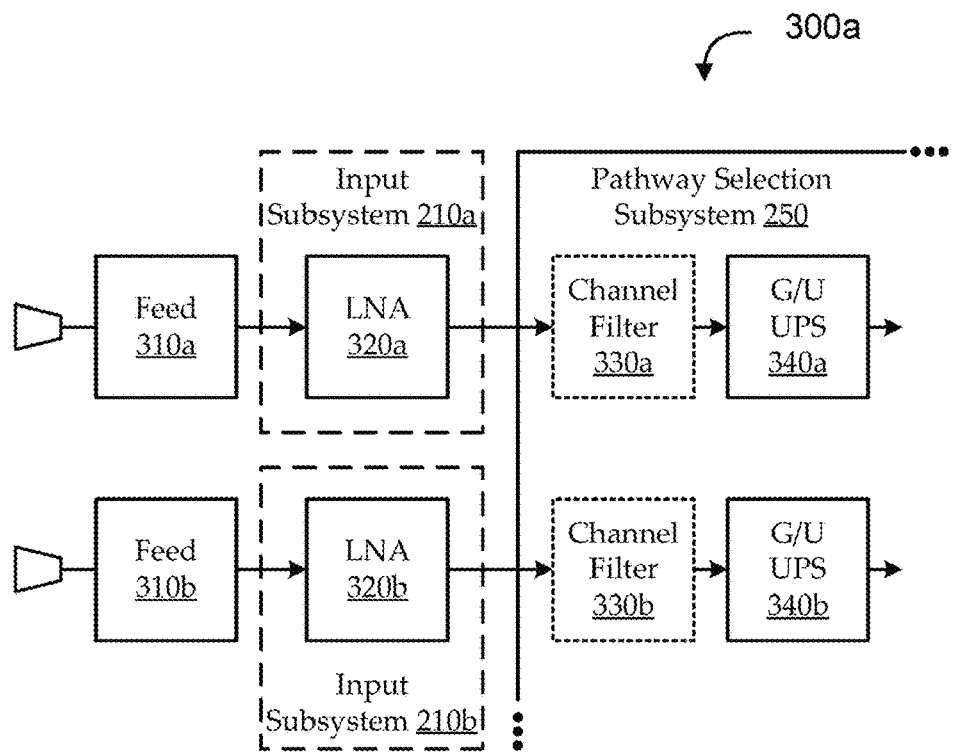
FIGS. 3A and 3B show simplified block diagrams of a portion of a satellite featuring illustrative implementations of input subsystems, according to various embodiments.
Figure 3B:
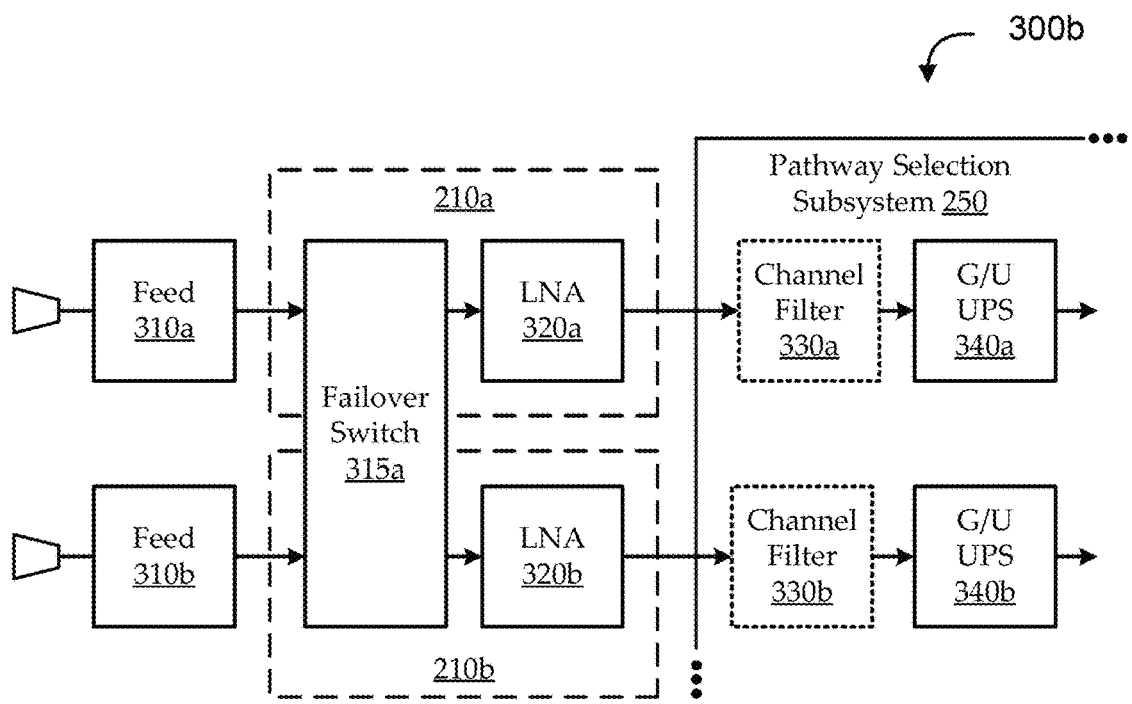

FIGS. 3A and 3B show simplified block diagrams of a portion of a satellite 300 featuring illustrative implementations of input subsystems 210, according to various embodiments. The portion of the satellite 300 can be a portion of the satellite 200 of FIG. 2. To avoid overcomplicating the illustration, the GUPSs 215 and UUPSs 217 are shown generally as uplink pathway selectors 340, and the gateway beam feeds 205 and user beam feeds 207 are shown generally as feeds 310. Turning first to FIG. 3A, each uplink pathway selector 340 is coupled with a respective feed 310 via a respective input subsystem 210. The input subsystems 210 are separate from each other, and each includes at least a low-noise amplifier (LNA) 320. For example, uplink signals are received by one of the feeds 310, amplified by the LNA 320 of a respective input subsystem 210, and passed to a respective uplink pathway selector 340 of the pathway selection subsystem 250.

In some embodiments, as illustrated, the pathway selection subsystem 250 (or, alternatively, each input subsystem 210) can include a channel filter 330. Each channel filter 330 can be tunable, selectable, and/or otherwise adjustable prior to deploying the satellite and/or when the satellite is on orbit. For example, while the pathway configuration controller 260 is shown as part of the pathway selection subsystem 250, some embodiments of the pathway configuration controller 260 can provide control signals for adjusting the channel filters 330 and/or other components that can be part of the signal pathways (i.e., and those components can be response to such control signals). The channel filters 330 can be used to provide various features.

Figure 10:
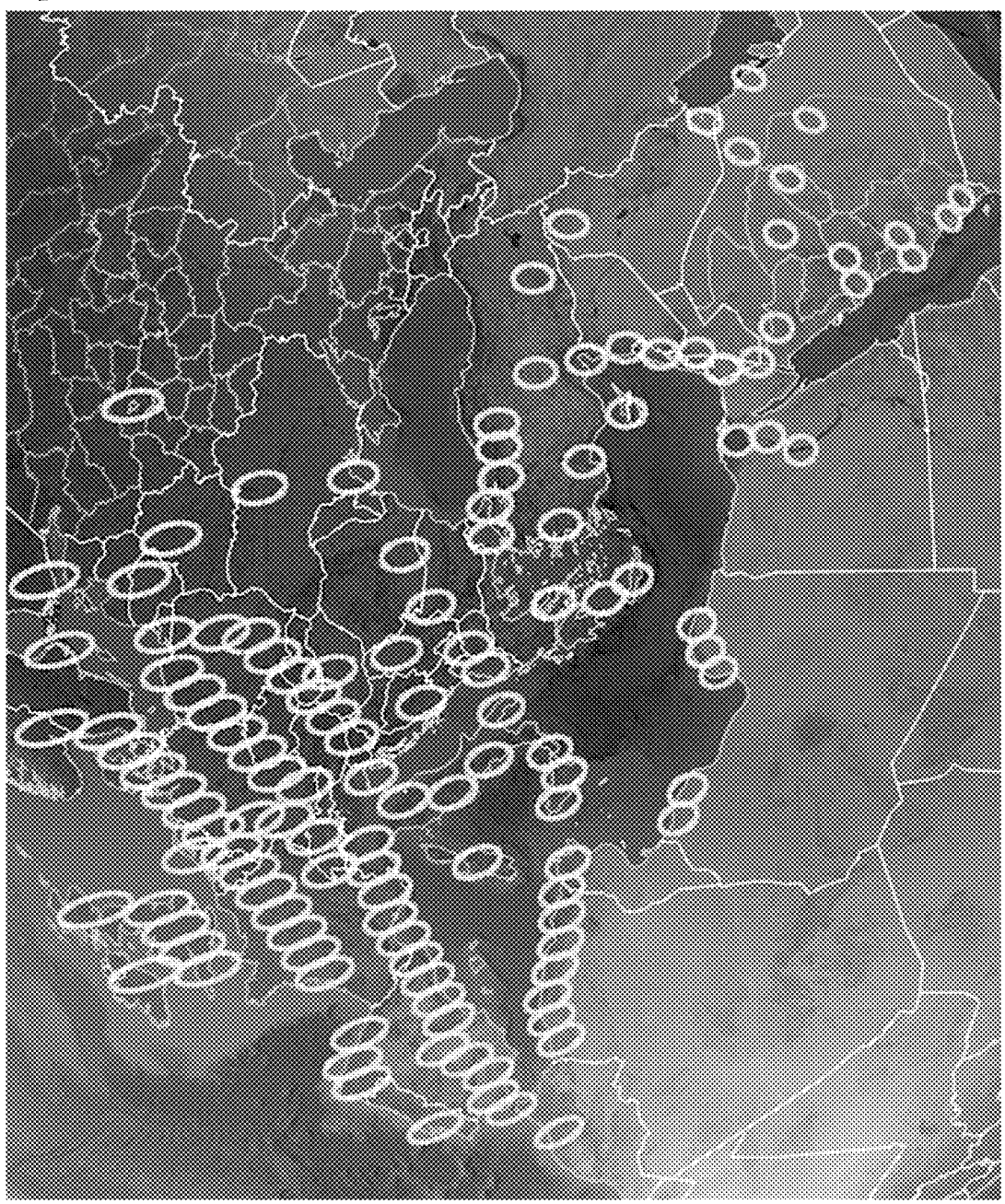
FIG. 10 shows an illustrative beam layout for a satellite communications system, like the ones described herein.

For the sake of illustration, FIG. 10 shows an illustrative beam layout 1000 for a satellite communications system, like the ones described herein. The illustrated beam layout has overlapping fixed spot beams with multiple colors (carrier frequencies). In context of such a layout, the channel filters 330 can be band-pass filters used to filter out noise and/or signals from other than the particular color of the beam associated with the respective feed 310 for that signal pathway. In one illustrative implementation, the beam map can include 240 large beams and 120 gateway terminals 165. The 120 gateway terminals 165 can support 240 feeder links, each having a throughput of approximately 3.5 Gigabits per second (Gbps), yielding a total system throughput of approximately 840 Gbps. In another illustrative implementation, the beam map can include 384 beams, including 128 dual-pol beams for communicating with gateway terminals 165, and 256 single-pol beams for communicating with user terminals 110. Such a configuration can support 512 signal pathways (e.g., transponders), providing approximately 987 Gbps of total system throughput.

Returning to FIG. 3A, as one example, the channel filters 330 can be used to mitigate retransmission of uplink noise received from uplink frequencies not used by that signal pathway (e.g., from other beam colors). As another example, frequency reuse schemes (e.g., time-division multiplexing, frequency-division multiplexing, etc.) and/or other techniques can use static or dynamic beam color assignments for flexible deployment of gateway terminals 165 (e.g., for different layouts, different geographies, different orbital slots, etc.), and the channel filters 330 can statically or dynamically tune the non-processed signal pathways to their respective frequencies of interest. Though the channel filters 330 are illustrated at the input side of the pathway selection subsystem 250, other implementations can alternatively or additionally include channel filters 330 at the output side of the pathway selection subsystem 250.

Turning to FIG. 3B, each uplink pathway selector 340 is coupled with a respective feed 310 via a respective input subsystem 210, as in FIG. 3A. Unlike FIG. 3A, the input subsystems 210 in FIG. 3B can be selectively coupled together by failover switches 315. In some implementations, the failover switches 315 include fast ferrite switches and can be operated dynamically at any suitable duty cycle to provide desired failover functionality. The illustrated embodiment shows a single failover switch 315 that provides selective failover capability for a pair of input subsystems 210. However, embodiments can include any suitable number of failover switches 315 (e.g., one per pair of input subsystems 210), and the failover switches 315 can select between any suitable number of input subsystems 210 (e.g., a pair, three, etc.). Embodiments of the failover switches 315 can include a normal mode and a failover mode. The failover mode can be activated, for example, when there is a problem with a gateway terminal 165 (e.g., a temporary or permanent gateway outage, etc.), a problem with one or more satellite components (e.g., a feed 310), or some other reason why it is desirable not to use a particular input subsystem 210. In the normal mode, the input subsystems 210 can operate effectively as illustrated in FIG. 3A. For example, when failover switch 315a is in the normal mode, uplink pathway selector 340a is coupled with feed 310a via LNA 320a, and uplink pathway selector 340b is coupled with feed 310b via LNA 320b. In the failover mode, the failover switch 315 bypasses at least one of the input subsystems 210 to which it is coupled. For example, when failover switch 315a is in the failover mode, uplink pathway selector 340a is coupled with feed 310b via LNA 320b, or uplink pathway selector 340b is coupled with feed 310a via LNA 320a.

Figure 4:
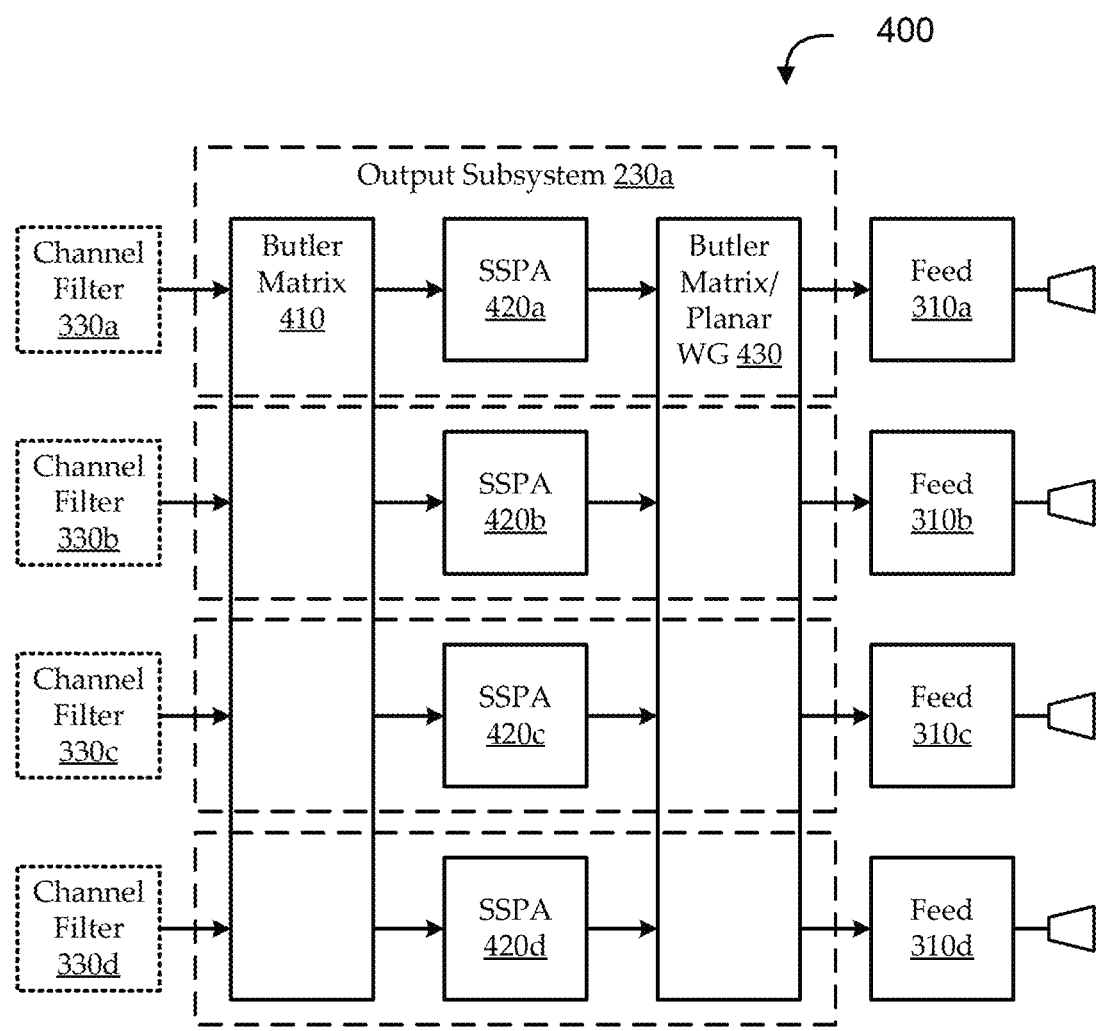
FIG. 4 shows a simplified block diagram of a portion of a satellite featuring an illustrative output subsystem, according to various embodiments.

FIG. 4 shows a simplified block diagram of a portion of a satellite 400 featuring an illustrative output subsystem 230, according to various embodiments. The portion of the satellite 400 can be a portion of the satellite 200 of FIG. 2. To avoid overcomplicating the illustration, the gateway beam feeds 205 and user beam feeds 207 are shown generally as feeds 310. As described with reference to FIG. 3A, some implementations can include channel filters 330 at the output side of the pathway selection subsystem 250, and those channel filters 330 can be implemented as part of the pathway selection subsystem 250 or as part of the output subsystems 230. Though four output subsystems 230 are illustrated, embodiments can include any suitable number of outputs subsystem 230 (e.g., one coupled with each downlink pathway selector).

In some embodiments, the output subsystems 230 are implemented as one or more multiport amplifiers that provide various features, such as facilitating sharing of radiofrequency power in the satellite 105 payload among several beams and/or ports. As shown, certain of the components can be shared by multiple of the output subsystems 230. Embodiments can include one or more N-port Butler matrices that can be shared by N output subsystems 230. For example, a first four-port Butler matrix 410 can be shared by four output subsystems 230 to provide flexible power distribution between beams (e.g., and/or to allow for degraded performance after a failure is detected); and a planar waveguide assembly 430 can be integrated with a second Butler matrix 430 also shared by the four output subsystems 230. Each output subsystem 230 can also include a power amplifier 420 (e.g., a radiofrequency solid-state power amplifier, or RF SSPA), that can be coupled between the Butler matrices 410, 430, or in any other suitable manner.

As described with reference to FIG. 2, embodiments of the pathway selection subsystem 250 can be implemented in various ways. FIGS. 5-9 show simplified block diagrams of various illustrative satellite communications systems. In each of FIGS. 5-9, the satellite 200 is shown as providing connectivity between ground terminals 505, including gateway terminals and user terminals. Uplink traffic from ground terminals 505 (e.g., forward uplink traffic from gateway terminals and return uplink traffic from user terminals) is received via uplink beams 515, and downlink traffic from ground terminals 505 (e.g., forward downlink traffic to user terminals and return downlink traffic to gateway terminals) is transmitted via downlink beams 540. The pathway selection subsystem 250 effectively provides dynamically reconfigurable connectivity between the uplink beams 515 and the downlink beams 540 via dynamically reconfigurable non-processed signal pathways. As described above, the signal pathways can include input subsystems 210 and output subsystems 230 that couple the pathway selection subsystem 250 with uplink antenna ports and downlink antenna ports of one or more antenna systems of the satellite 200. Though not explicitly shown, as described with reference to FIG. 2, embodiments of the pathway selection subsystem 250 include a data store 240 having one or more pathway selection schedules 242 stored thereon. Some embodiments can receive control signals while the satellite 200 is on orbit to modify one or more of the stored pathway selection schedules 242.

Figure 5:
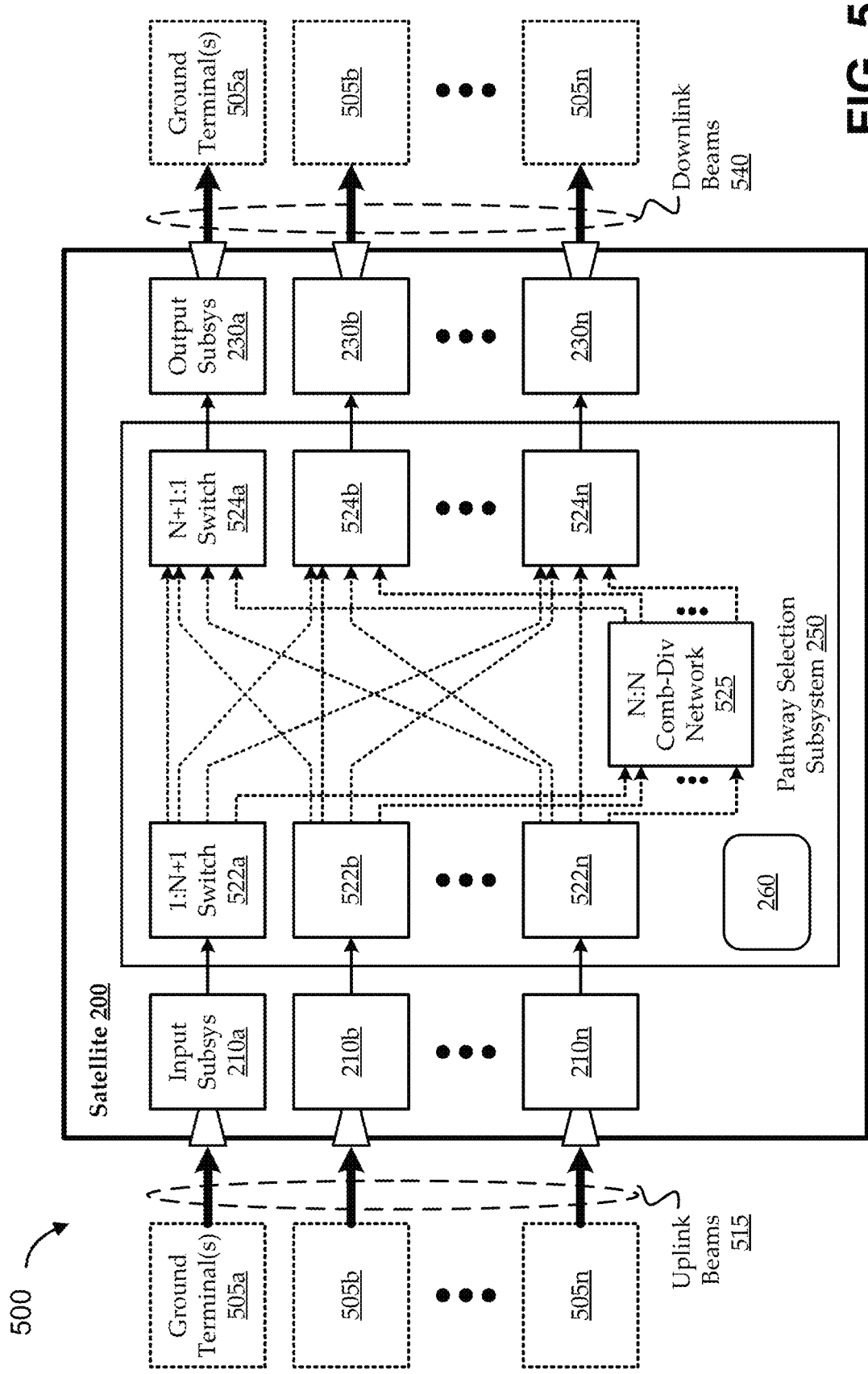
FIG. 5 shows a simplified block diagram of an illustrative satellite communications system, in which the pathway selection subsystem includes pathway selection switches and a divider-combiner network, according to various embodiments.

FIG. 5 shows a simplified block diagram of an illustrative satellite communications system 500, in which the pathway selection subsystem 250 includes pathway selection switches and a divider-combiner network 525, according to various embodiments. The pathway selection subsystem 250 includes uplink pathway selectors implemented as uplink (1:N+1) switches 522, downlink pathway selectors implemented as downlink (N+1:1) switches 524, and a divider-combiner network (N:N) 525. Various embodiments are described herein with reference to switches and networks. As used herein, a "1:M switch" generally refers to a device, or group of devices, that selectively couples a single input to one, and only one, of M outputs; and a "M:1 switch" generally refers to a device, or group of devices, that selectively couples one, and only one, of M inputs to a single output. A "M:M divider-combiner network" generally refers to a device, or group of devices, that divides each of M inputs into M copies, and combines a respective copy of each of the M inputs at M outputs, such that all M inputs are effectively coupled with all M outputs. As described above, embodiments include a pathway scheduling controller 260 that can send control signals to the uplink switches 522 and downlink switches 524 to effectuate a desired configuration of non-processed signal pathways (e.g., according to a pathway selection schedule 242).

The uplink switches 522 can be implementations of the GUPSs 215 and/or UUPSs 217 of FIG. 2, and the downlink switches 524 can be implementations of the GDPSs 220 and/or UDPSs 222 of FIG. 2. As illustrated, each uplink switch 522 can have an uplink switch input (e.g., an input port, or any suitable input coupling) coupled with a respective uplink antenna port of an antenna feed via a respective input subsystem 210, and each uplink switch 522 can also have N+1 uplink switch outputs (e.g., an output port, or any suitable output coupling). Each downlink switch 524 can have a downlink switch output coupled with a respective downlink antenna port of an antenna feed via a respective output subsystem 230, and each downlink switch 524 can also have N+1 downlink switch inputs. In FIGS. 5-9, certain features, such as the uplink antenna ports 201, downlink antenna ports 202, data store 240, etc. are not shown to avoid over-complicating the illustration. Each of N of the uplink switch outputs is coupled with a corresponding downlink switch input of a respective one of the downlink switches 524. For example, the first uplink switch output of each of the N uplink switches 522 is coupled with a corresponding one of N of the downlink switch inputs the first downlink switch 524a, the second uplink switch output of each of the N uplink switches 522 is coupled with a corresponding one of N of the downlink switch inputs the second downlink switch 524b, etc.

As illustrated, each uplink switch 522 has N+1 outputs, of which N (referred to herein as monocast outputs) are each directly coupled to a different respective one of the N downlink switches 524, and the additional output (referred to herein as a simulcast output) is coupled with the divider-combiner network 525. Similarly, each downlink switch 524 has N+1 inputs, of which N (referred to herein as monocast inputs) are each directly coupled to a different respective one of the N uplink switches 522, and the additional input (referred to herein as a simulcast input) is coupled with the divider-combiner network 525. As such, the divider-combiner network 525 includes N divider-combiner network (DCN) inputs, each directly coupled to a respective uplink switch output, and the divider-combiner network 525 includes N DCN outputs, each directly coupled to a respective downlink switch input. Embodiments of the divider-combiner network 525 can effectively port all its inputs to all its outputs. In some embodiments, the divider-combiner network 525 is a power combiner/divider. For example, signals received at any one or more of the N DCN inputs are combined and output via all of the N DCN outputs.

The monocast and simulcast outputs can be used to enable monocast and simulcast modes of operation of the pathway selection subsystem 250. For the sake of illustration, in a first timeframe, the pathway selection subsystem 250 is configured to include a monocast signal pathway between ground terminal 505a and ground terminal 505b. This can involve switching uplink switch 522a and downlink switch 524b to activate the coupling between uplink switch 522a and downlink switch 524b (i.e., by selecting the appropriate uplink switch output and downlink switch input corresponding to that coupling). In a second timeframe, the pathway selection subsystem 250 is configured to include a simulcast signal pathway between ground terminal 505a and ground terminals 505b and 505n. This can involve switching uplink switch 522a to activate its simulcast output (thereby coupling uplink switch 522a to the divider-combiner network 525 via a corresponding DCN input), and switching downlink switch 524b and downlink switch 524n to activate their respective simulcast inputs (thereby coupling downlink switch 524b and downlink switch 524n to the divider-combiner network 525 via respective DCN outputs). In this way, the divider-combiner network 525 provides a simulcast signal pathway between the uplink beam 515 associated with uplink switch 522a and both of the downlink beams 540 associated with downlink switches 524b and 524n.

Figure 6:
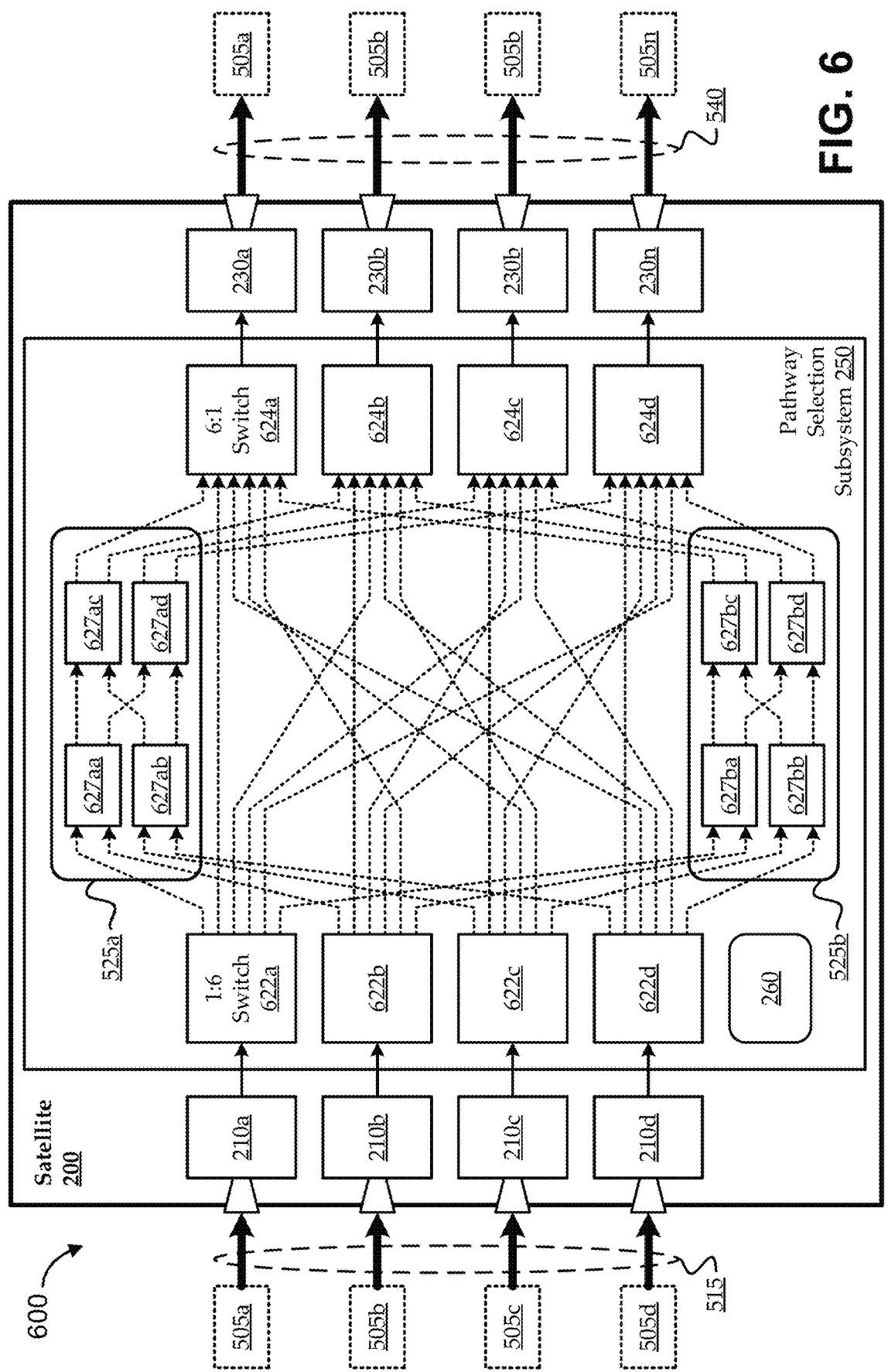
FIG. 6 shows a simplified block diagram of another illustrative satellite communications system, in which the pathway selection subsystem includes pathway selection switches and a divider-combiner network, according to various embodiments.

FIG. 6 shows a simplified block diagram of another illustrative satellite communications system 600, in which the pathway selection subsystem 250 includes pathway selection switches and divider-combiner networks 525, according to various embodiments. The system 600 of FIG. 6 can operate similarly to the system 500 of FIG. 5, except that the pathway selection subsystem 250 includes two divider-combiner networks 525, for example to concurrently support two simulcast signal pathways. To avoid overcomplicating the illustration, only four uplink switches 622, four downlink switches 624, and two divider-combiner networks 525 are shown. However, the techniques described herein can be applied with any suitable number of uplink switches 622, downlink switches 624, divider-combiner networks 525, for example, to enable a desired maximum number of monocast signal pathways, a desired maximum number of concurrent simulcast signal pathways, etc. As in FIG. 5, a pathway scheduling controller 260 can send control signals to the uplink switches 622 and downlink switches 624 to effectuate a desired configuration of non-processed signal pathways (e.g., according to a pathway selection schedule 242).

Each of the uplink switches 622 is a 1:N+2 (1:6 in the illustrated case) selector switch, and each of the downlink switches 624 is a N+2:1 (6:1 in the illustrated case) selector switch. For example, the uplink switches 622 can be implementations of the GUPSs 215 and/or UUPSs 217 of FIG. 2, and the downlink switches 624 can be implementations of the GDPSs 220 and/or UDPSs 222 of FIG. 2. Further, each of the two divider-combiner networks 525 is illustrated as an N:N (4:4 in the illustrated case) divider-combiner network 525 implemented using a network of four 2:2 divider-combiner circuit blocks 627 (e.g., hybrid couplers). Similar to FIG. 5, each uplink switch 622 can have an uplink switch input coupled with a respective uplink antenna port 201 of an antenna feed via a respective input subsystem 210; and each uplink switch 622 can also have six uplink switch outputs, four coupled directly to respective downlink switches 624 as monocast outputs, and 2 coupled with respective divider-combiner networks 525 as simulcast outputs. Each downlink switch 624 can have a downlink switch output coupled with a respective downlink antenna port of an antenna feed via a respective output subsystem 230; and each downlink switch 624 can also have six downlink switch inputs, four coupled directly to respective uplink switches 622 as monocast inputs, and 2 coupled with respective divider-combiner networks 525 as simulcast inputs.

Each divider-combiner network 525 includes N divider-combiner network (DCN) inputs, each directly coupled to a respective uplink switch simulcast output; and each divider-combiner network 525 includes N DCN outputs, each directly coupled to a respective downlink switch simulcast input. As illustrated, each divider-combiner network 525 in made up of four 2:2 divider-combiner circuit blocks 627. Each divider-combiner circuit block 627 can effectively port all its inputs to all its outputs. For example, a signals A and B are received at first and second inputs; signals A and B are each divided (e.g., by a power divider); and each divided signal A is combined with a respective divided signal B (e.g., by a power combiner), such that a first combination of divided signals A and B is seen at a first output, and a second combination of divided signals A and B is seen at a second output. In such an implementation, if there is only a signal A and no signal B (i.e., only the first input receives a signal, and there is no signal at the second input), signal A will effectively be repeated at both outputs. The four divider-combiner circuit blocks 627 are arranged as a pair of input divider-combiner circuit blocks 627 (e.g., 627aa and 627ab in one divider-combiner network 525a, and 627ba and 627bb in another divider-combiner network 525b), and a pair of output divider-combiner circuit blocks 627 (e.g., 627ac and 627ad in divider-combiner network 525a, and 627bc and 627bd in divider-combiner network 525b), and each input pair is cross-coupled with the output pair in its divider-combiner network 525. In such a configuration, any signal at the DCN inputs of a particular divider-combiner network 525 can be passed to either of its output pair of divider-combiner circuit blocks 627, and thereby to any of the DCN outputs of that divider-combiner network 525. Accordingly, in each divider-combiner network 525 signals received at any one or more of its N DCN inputs are combined and output via all of its N DCN outputs. In this way, each divider-combiner network 525 can enable configuration of a simulcast signal pathway that simulcasts uplink signals received by any of the uplink switches 622 via any two or more of the downlink switches 624 (e.g., as described above with reference to FIG. 5).

Figure 7:
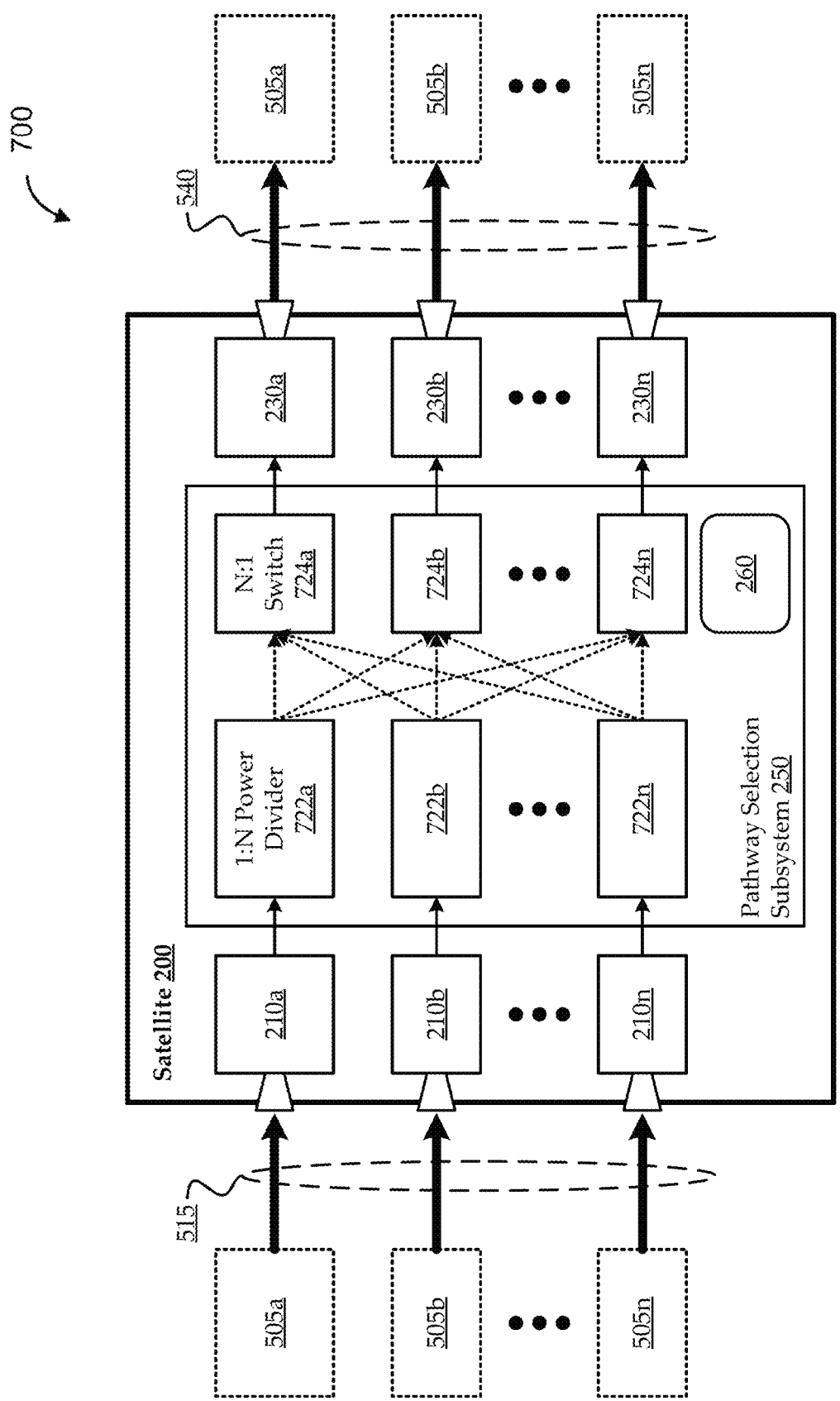
FIG. 7 shows a simplified block diagram of an illustrative satellite communications system, in which the pathway selection subsystem includes power dividers and pathway selection switches and a divider-combiner network, according to various embodiments.

FIG. 7 shows a simplified block diagram of an illustrative satellite communications system 700, in which the pathway selection subsystem 250 includes power dividers and pathway selection switches and a divider-combiner network, according to various embodiments. The pathway selection subsystem 250 includes uplink pathway selectors implemented as uplink power dividers (PD) 722, and downlink pathway selectors implemented as downlink (N:1) switches 724. For example, the uplink power dividers 722 can be implementations of the GUPSs 215 and/or UUPSs 217 of FIG. 2, and the downlink switches 724 can be implementations of the GDPSs 220 and/or UDPSs 222 of FIG. 2. In some embodiments, a pathway scheduling controller 260 can send control signals to the downlink switches 724 to effectuate a desired configuration of non-processed signal pathways (e.g., according to a pathway selection schedule 242). As illustrated, each uplink power divider 722 can have an uplink PD input coupled with a respective uplink antenna port 201 of an antenna feed via a respective input subsystem 210, and each uplink power divider 722 can also have N uplink PD outputs. Each downlink switch 724 can have a downlink switch output coupled with a respective downlink antenna port of an antenna feed via a respective output subsystem 230, and each downlink switch 724 can also have N downlink switch inputs. Each of N of the uplink PD outputs is coupled with a corresponding downlink switch input of a respective one of the downlink switches 724.

Each uplink power divider 722 operates to receive a signal at the uplink PD input and to output that signal at all its uplink PD outputs. Accordingly, all the uplink signals received by the uplink power dividers 722 are output by the uplink power dividers 722 to all the downlink switches 724, such that the configuration of non-processed signal pathways is defined by the configurations of the downlink switches 724. For example, the uplink signal from uplink power divider 722*a* can be passed through downlink switch 724*a* by configuring downlink switch 724*a* to activate the one of its inputs coupled to uplink power divider 722*a*. A simulcast mode can be enabled by configuring multiple of the downlink switches 724 to activate their couplings to a same one of the uplink power dividers 722. For example, the uplink signal from uplink power divider 722*a* can be simulcast through downlink switch 724*a* and downlink switch 724*b* by configuring downlink switch 724*a* to activate the one of its inputs coupled to uplink power divider 722*a* and configuring downlink switch 724*b* to activate the one of its inputs coupled to uplink power divider 722*a*.

Figure 8:
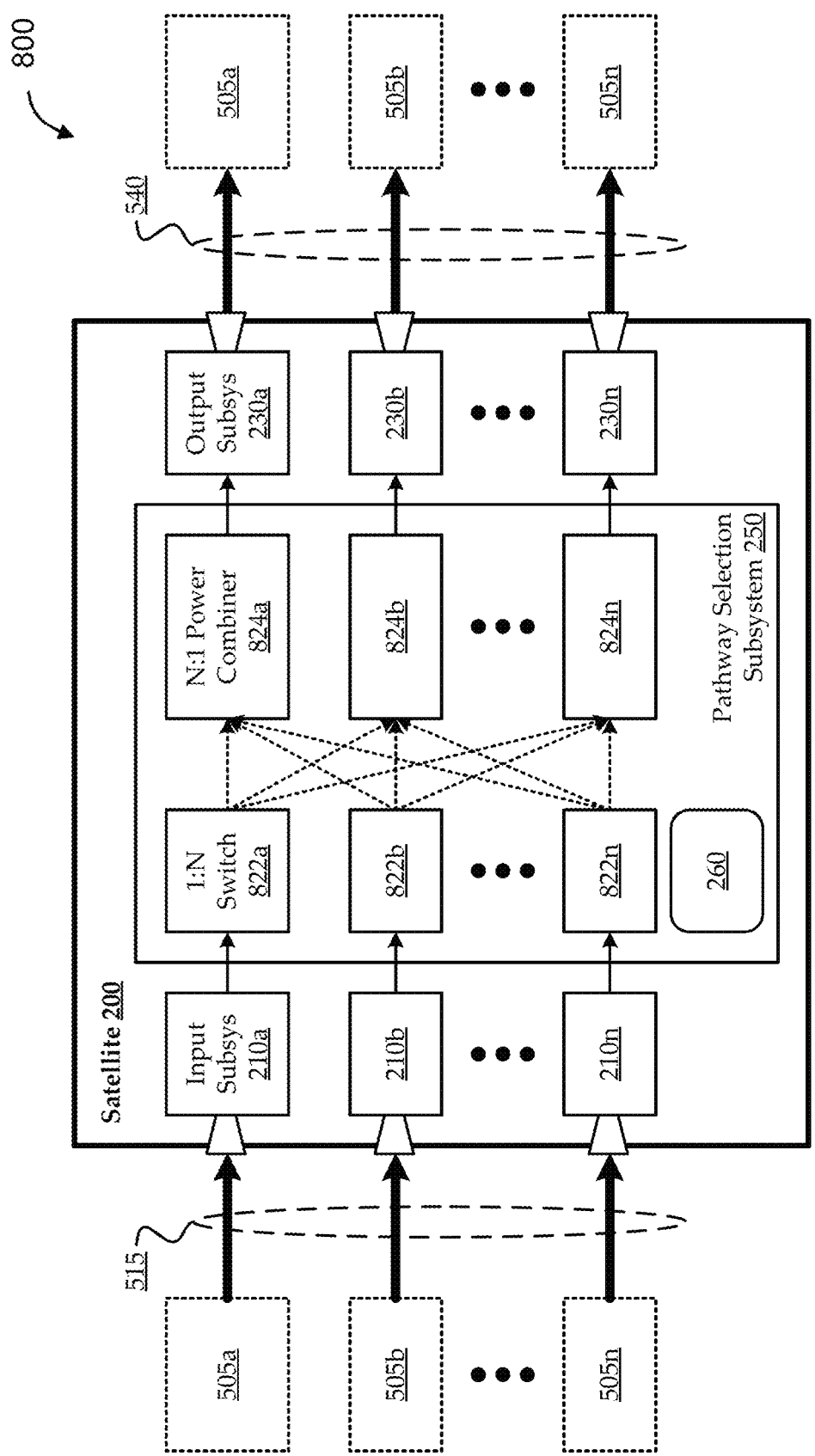
FIG. 8 shows a simplified block diagram of an illustrative satellite communications system, in which the pathway selection subsystem includes pathway selection switches and power combiners, according to various embodiments.

FIG. 8 shows a simplified block diagram of an illustrative satellite communications system 800, in which the pathway selection subsystem 250 includes pathway selection switches and power combiners, according to various embodiments. The pathway selection subsystem 250 includes uplink pathway selectors implemented as uplink (1:N) switches 822, and downlink pathway selectors implemented as downlink power combiners (PC) 824. For example, the uplink switches 822 can be implementations of the GUPSs 215 and/or UUPSs 217 of FIG. 2, and the downlink power combiners 824 can be implementations of the GDPSs 220 and/or UDPSs 222 of FIG. 2. In some embodiments, a pathway scheduling controller 260 can send control signals to the uplink switches 822 to effectuate a desired configuration of non-processed signal pathways (e.g., according to a pathway selection schedule 242). As illustrated, each uplink switch 822 can have an uplink switch input coupled with a respective uplink antenna port 201 of an antenna feed via a respective input subsystem 210, and each uplink switch 822 can also have N uplink switch outputs. Each downlink power combiner 824 can have a downlink PC output coupled with a respective downlink antenna port 202 of an antenna feed via a respective output subsystem 230, and each downlink power combiner 824 can also have N downlink PC inputs. Each of N of the uplink switch outputs is coupled with a corresponding downlink PC input of a respective one of the downlink power combiners 824.

Each downlink power combiner 824 operates to receive signals at all its downlink PC inputs and to output a combination of those signals at is downlink PC output. Accordingly, the downlink power combiner 824 effective pass through whatever signals they receive from whichever one or more of the uplink switches 822, such that the configuration of non-processed signal pathways is defined by the configurations of the uplink switches 822. For example, the uplink signal from uplink switch 822*a* can be passed through downlink power combiner 824*a* by configuring uplink switch 822*a* to activate the one of its inputs coupled to downlink power combiner 824*a*. In a monocast mode, no other uplink switches 822 would be configured to activate their respective coupling to downlink power combiner 824*a*, such that downlink power combiner 824*a* only passes the signal from uplink switches 822*a* through to its downlink PC output. A simulcast mode can be enabled by configuring multiple of the uplink switches 822 to activate their couplings to a same one of the downlink power combiners 824. For example, the uplink signals from uplink switch 822*a* and uplink switch 822*b* can be simulcast through downlink power combiner 824*a* by configuring uplink switch 822*a* to activate the one of its outputs coupled to downlink power combiner 824*a* and configuring uplink switch 822*b* to activate the one of its outputs coupled to downlink power combiner 824*a*.

Figure 9:
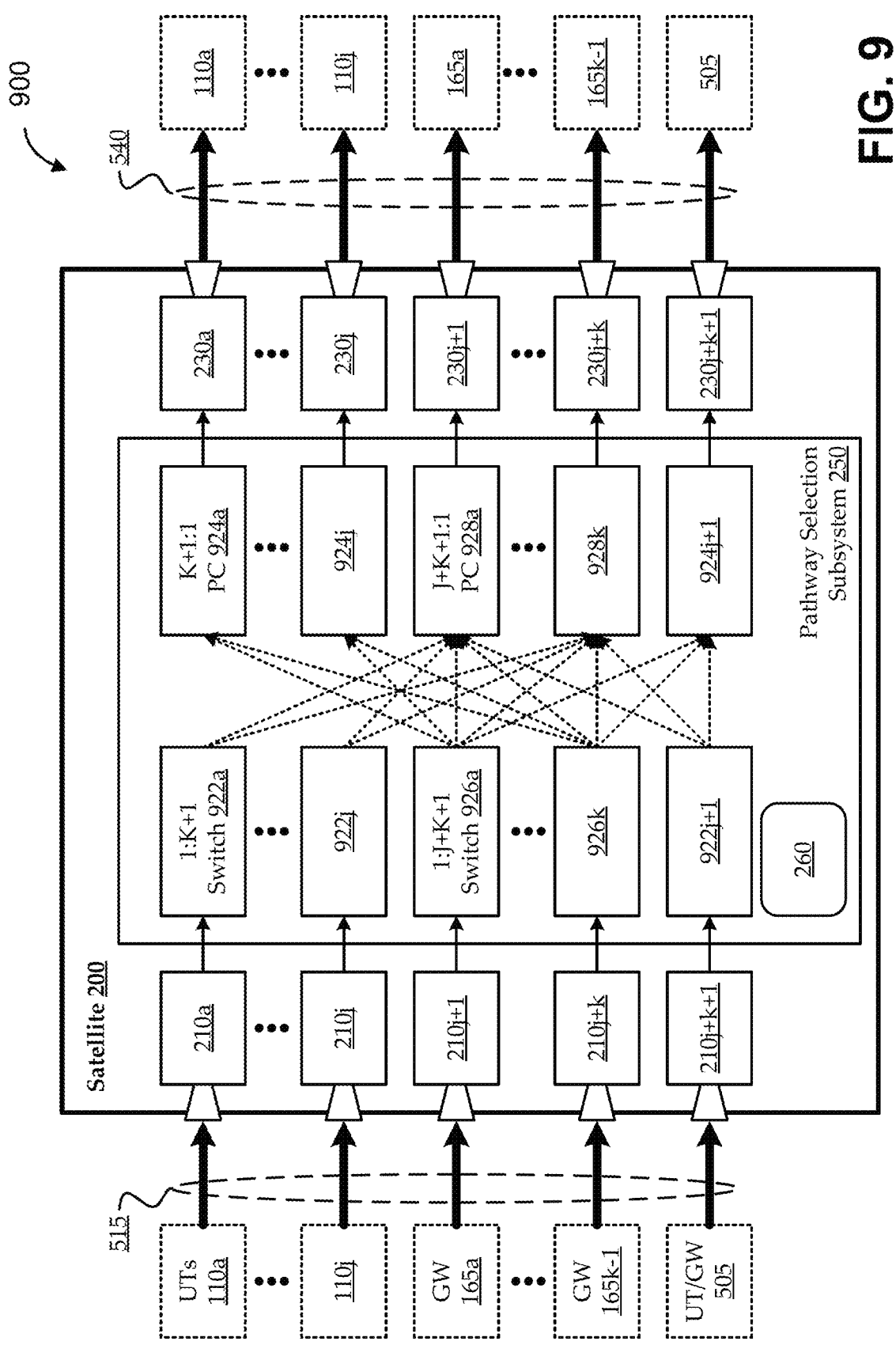
FIG. 9 shows a simplified block diagram of another illustrative satellite communications system, in which the pathway selection subsystem includes pathway selection switches and power combiners, according to various embodiments.

FIG. 9 shows a simplified block diagram of another illustrative satellite communications system 900, in which the pathway selection subsystem 250 includes pathway selection switches and power combiners, according to various embodiments. The satellite communications system 900 can be an implementation of the satellite communications system 800 of FIG. 8. As in FIG. 8, the pathway selection subsystem 250 includes uplink pathway selectors implemented as uplink switches, and downlink pathway selectors implemented as downlink power combiners. Unlike in FIG. 8, where components are not generally associated with ground terminals 505, FIG. 9 illustrates associations with user terminals 110 disposed in the coverage areas of respective user beams, gateway terminals 165 disposed in the coverage areas of respective gateway beams, and ground terminals 505 disposed in a beam having both user terminals 110 and a gateway terminal 165. As in FIG. 8 (and similar to FIG. 7), a combination of switches and power combiners can be used to enable dynamically reconfigurable signal pathways with monocast and simulcast modes.

In the illustrated embodiment, there are J user beams (e.g., including J user uplink beams and J user downlink beams), K gateway beams (e.g., including K gateway uplink beams and K gateway downlink beams), and one user/gateway beam having both a gateway terminal 165 and user terminals 110 disposed within its coverage area (e.g., includes a user/gateway uplink beam and a user/gateway downlink beam). Accordingly, on the input side of the pathway selection subsystem 250, there are J user uplink switches 922a . . . j, each receiving return uplink traffic from an associated user uplink beam via a respective input subsystem 210; K gateway uplink switches 926a . . . k, each receiving forward uplink traffic from an associated gateway uplink beam via a respective input subsystem 210; and one user/gateway uplink switch that can be implemented as an additional user uplink switch 922j+1 and can receive forward and return uplink traffic from the associated user/gateway uplink beam via the respective input subsystem 210j+k+1. As in FIG. 8, a pathway scheduling controller 260 can send control signals to the uplink switches 922 to effectuate a desired configuration of non-processed signal pathways (e.g., according to a pathway selection schedule 242). On the output side of the pathway selection subsystem 250, there are J user downlink power combiners 924a . . . j, each transmitting forward downlink traffic to an associated user downlink beam via a respective output subsystem 230; K gateway downlink power combiners 928a . . . k, each transmitting return downlink traffic to an associated gateway downlink beam via a respective output subsystem 230; and one user/gateway downlink power combiner that can be implemented as an additional user downlink power combiner 924j+1 and can transmit forward and return downlink traffic to the associated user/gateway downlink beam via the respective output subsystem 230j+k+1.

As illustrated, the pathway selection subsystem 250 can be configured to couple any of the user uplink beams with any one or more of the gateway downlink beams (e.g., including the user/gateway downlink beam). Accordingly, the user uplink switches 922 are illustrated as having K+1 outputs to couple with the K gateway downlink power combiners 928 and the user/gateway downlink power combiner 924j+1. The pathway selection subsystem 250 can also be configured to couple any of the gateway uplink beams with any one or more of the user downlink beams and/or gateway downlink beams (e.g., including the user/gateway downlink beam). Accordingly, the gateway uplink switches 926 are illustrated as having J+K+1 outputs to couple with the J user downlink power combiners 924, the K gateway downlink power combiners 928, and the user/gateway downlink power combiner 924j+1. The illustrated implementation of the user/gateway pathway selectors is designed so that the user/gateway uplink beam can be coupled with any of the gateway downlink beams and/or with its own corresponding user/gateway downlink beam. Accordingly, the user/gateway uplink switch 922j+1 is illustrated as having K+1 outputs to couple with the K gateway downlink power combiners 928 and the user/gateway downlink power combiner 924j+1. Alternatively, the user/gateway pathway selectors can be designed so that the user/gateway uplink beam can be coupled with any of the gateway downlink beams, with any of the user downlink beams, and/or with its own corresponding user/gateway downlink beam. In such an implementation, the user/gateway uplink switch 922j+1 can be implemented as an additional gateway uplink switches having J+K+1 outputs to couple with the J user downlink power combiners 924, the K gateway downlink power combiners 928, and the user/gateway downlink power combiner 924j+1.

The systems shown in FIGS. 1-10 enable various embodiments for providing dynamic reconfiguration of non-processed signal pathways in a manner that supports one or more simulcast signal pathways. These and/or other embodiment include means for receiving multiple uplink signals via multiple fixed uplink spot beams. The means for receiving can include any one or more of the uplink and/or input elements described above. For example, the means for receiving can include receive-side antenna elements (e.g., antenna beam feeds, uplink antenna ports, reflectors, etc.) and/or input subsystem elements (e.g., amplifiers, failover switches, frequency converters, channel filters, etc.). Embodiments can further include means for transmitting multiple downlink signals via the multiple downlink fixed spot beams. The means for transmitting can include any one or more of the downlink and/or output elements described above. For example, the means for transmitting can include transmit-side antenna elements (e.g., antenna beam feeds, downlink antenna ports, reflectors, etc.) and/or output subsystem elements (e.g., amplifiers, waveguides, Butler matrixes, frequency converters, channel filters, etc.).

Such embodiments can further include means for dynamically forming multiple non-processed signal pathways to selectively couple the means for receiving with the means for transmitting. The means for dynamically forming can be implemented, such that, in a simulcast mode, at least two of the downlink signals are formed from a same one of uplink signals (i.e., an uplink signal received via one uplink beam can be simulcast as downlink signals via at least two downlink beams). The means for dynamically forming can include any suitable elements for dynamically reconfiguring non-processed signal pathways, as described above. In some embodiments, the means for dynamically forming include elements of the pathway selector system, such as the uplink and/or downlink pathway selectors, one or more divider-combiner networks, etc. In other embodiments, the means for dynamically forming can include components of the input and/or output subsystems not included in the means for receiving or the means for transmitting. For example, the means for dynamically forming can include one or more amplifiers, filters, converters, etc.

Figure 11:
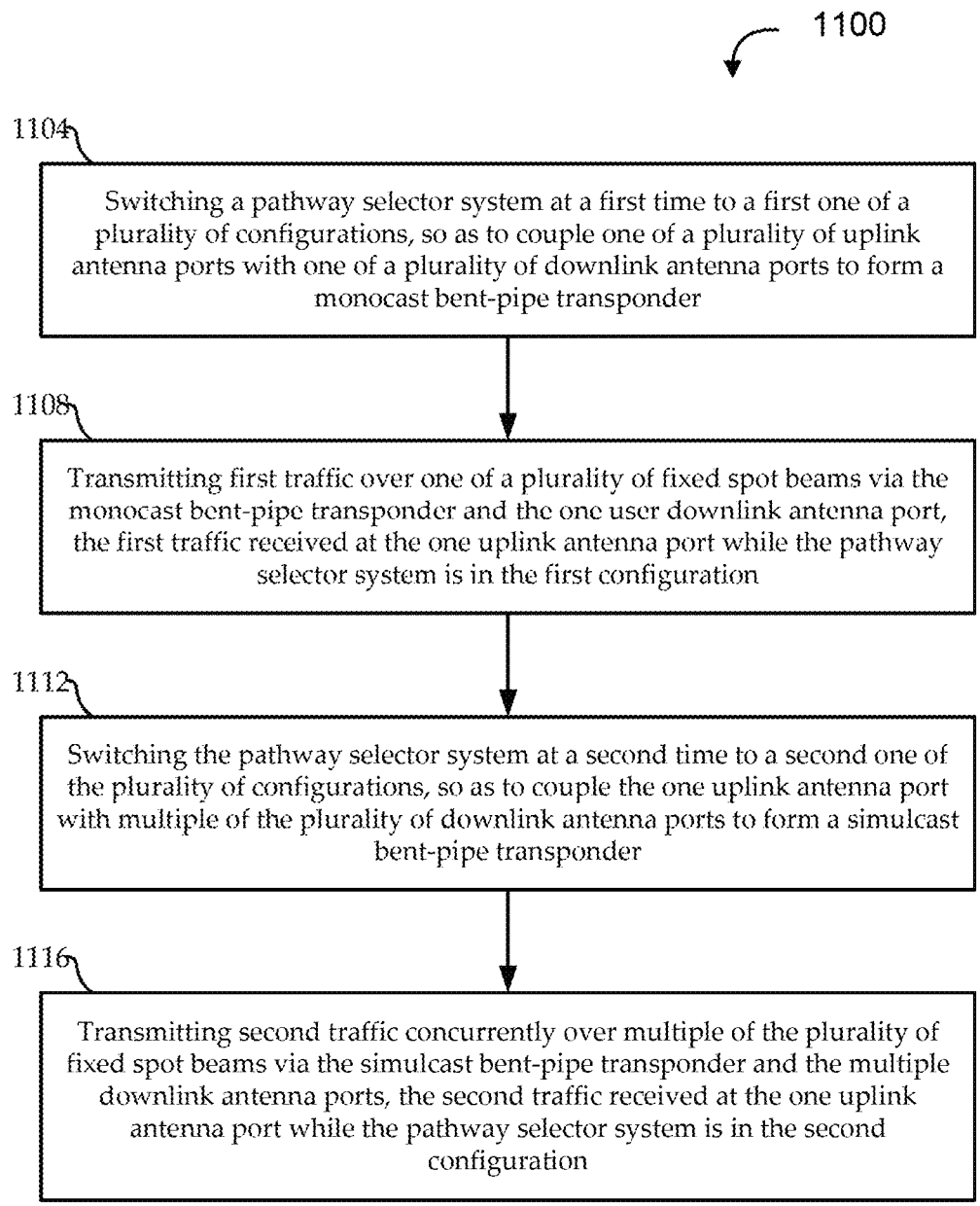
FIG. 11 shows a flow diagram of an illustrative method for flexible intra-satellite routing of communications between a plurality of fixed spot beams, according to various embodiments.

FIG. 11 shows a flow diagram of an illustrative method 1100 for flexible intra-satellite routing of forward-link communications between a plurality of fixed spot beams, according to various embodiments. Embodiments of the method 1100 begin at stage 1104, at a first time, by switching a pathway selector system to a first one of multiple configurations, so as to couple one of a number of uplink antenna ports with one of a number of downlink antenna ports to form a monocast non-processed (bent-pipe) signal pathway. At stage 1108, embodiments can transmit first traffic over one of a number of fixed spot beams via the monocast non-processed signal pathway and the one downlink antenna port. In some embodiments, at stage 1104, the one uplink antenna port is a gateway uplink antenna port, and the one downlink antenna port is a user downlink antenna port, thereby forming a forward-link monocast non-processed signal pathway. In such embodiments, at stage 1108, the first traffic is forward-link traffic received at the one gateway uplink antenna port while the pathway selector system is in the first configuration. In other embodiments, at stage 1104, the one uplink antenna port is a user uplink antenna port, and the one downlink antenna port is a gateway downlink antenna port, thereby forming a return-link monocast non-processed signal pathway. In such embodiments, at stage 1108, the first traffic is return-link traffic received at the one user uplink antenna port while the pathway selector system is in the first configuration.

At stage 1112, at a second time (different from the first time), embodiments can switch the pathway selector system to a second one of the configurations, so as to couple the one uplink antenna port with multiple of the plurality of downlink antenna ports to form a simulcast non-processed signal pathway. At stage 1116, embodiments can transmit second traffic concurrently over multiple of the plurality of fixed spot beams via the simulcast non-processed signal pathway and the multiple downlink antenna ports. In some embodiments, at stage 1112, the one uplink antenna port is a gateway uplink antenna port, and the multiple downlink antenna ports are user downlink antenna ports, thereby forming a forward-link simulcast non-processed signal pathway. In such embodiments, at stage 1116, the second traffic is forward-link traffic received at the one gateway uplink antenna port while the pathway selector system is in the second configuration. In other embodiments, at stage 1112, the one uplink antenna port is a user uplink antenna port, and the multiple downlink antenna ports are gateway downlink antenna ports, thereby forming a return-link simulcast non-processed signal pathway. In such embodiments, at stage 1116, the second traffic is return-link traffic received at the one user uplink antenna port while the pathway selector system is in the second configuration.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The various operations of methods and functions of certain system components described above can be performed by any suitable means capable of performing the corresponding functions. These means can be implemented, in whole or in part, in hardware. Thus, they can include one or more Application Specific Integrated Circuits (ASICs) adapted to perform a subset of the applicable functions in hardware. Alternatively, the functions can be performed by one or more other processing units (or cores), on one or more integrated circuits (ICs). In other embodiments, other types of integrated circuits can be used (e.g., Structured/Platform ASICs, Field Programmable Gate Arrays (FPGAs), and other Semi-Custom ICs), which can be programmed. Each can also be implemented, in whole or in part, with instructions embodied in a computer-readable medium, formatted to be executed by one or more general or application specific controllers. Embodiments can also be configured to support plug-and-play functionality (e.g., through the Digital Living Network Alliance (DLNA) standard), wireless networking (e.g., through the 802.11 standard), etc.

The steps of a method or algorithm or other functionality described in connection with the present disclosure, can be embodied directly in hardware, in a software module executed by a processor, or in a combination of the two. A software module can reside in any form of tangible storage medium. Some examples of storage media that can be used include random access memory (RAM), read only memory (ROM), flash memory, EPROM memory, EEPROM memory, registers, a hard disk, a removable disk, a CD-ROM and so forth. A storage medium can be coupled to a processor such that the processor can read information from, and write information to, the storage medium. In the alternative, the storage medium can be integral to the processor.

A software module can be a single instruction, or many instructions, and can be distributed over several different code segments, among different programs, and across multiple storage media. Thus, a computer program product can perform operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A bent-pipe satellite having flexible intra-satellite communications between a plurality of fixed spot beams, the satellite comprising:
   a fixed spot beam antenna subsystem having a plurality of uplink antenna ports and a plurality of downlink antenna ports; and
   a pathway selection subsystem comprising:
      a combiner-divider network;
      one or more sets of interconnected switches controllable to activate a non-processed monocast signal pathway between any uplink antenna port and any downlink antenna port, based on switching an input subsystem associated with the uplink antenna port into connection with an output subsystem associated with the downlink antenna port, and further controllable to activate non-processed simulcast signal pathways between any uplink antenna port and any two or more downlink antenna ports, based on switching the input subsystem associated with the uplink antenna port into connection with a respective input of the combiner-divider network and switching the output subsystems associated with the two or more downlink antenna ports into connection with respective outputs of the combiner-divider network; and a pathway scheduling controller that provides control signals to control the one or more sets of interconnected switches, to activate monocast or simulcast signal pathways between respective ones of the uplink and downlink antenna ports, according to a pathway selection schedule;

wherein the one or more sets of interconnected switches comprise a set of input switches and a set of output switches, and wherein:

each input switch has a switch input corresponding to a respective one of the uplink antenna ports and has N+1 switch outputs comprising N monocast outputs coupled to respective monocast inputs of the output switches and one simulcast output coupled to the combiner-divider network;

each output switch has a switch output corresponding to a respective one of the downlink antenna ports and has N+1 switch inputs comprising N monocast inputs and one simulcast input coupled to the combiner-divider network; and the combiner-divider network comprises N inputs corresponding to respective ones of the input switches and N outputs corresponding to respective ones of the output switches.

2. The bent-pipe satellite of claim 1, wherein the set of input switches comprises a plurality of Uplink Pathway Selectors (UPSs) and the set of output switches comprises a corresponding plurality of Downlink Pathway Selectors (DPSs), and wherein:

each UPS comprises a UPS input coupled with a respective one of the uplink antenna ports via the associated input subsystem, and a plurality of UPS outputs;

each DPS comprises a DPS output coupled with a respective one of the downlink antenna ports via the associated output subsystem, and a plurality of DPS inputs; and each of at least some of the DPS inputs is coupled with one of the UPS outputs.

3. The bent-pipe satellite of claim 2, wherein, to activate a monocast signal pathway between a particular one of the uplink antenna ports and a particular one of the downlink antenna ports, the pathway scheduling controller is configured to activate the UPS output of the respective UPS that is coupled to one of the DPS inputs of the respective DPS.

4. The bent-pipe satellite of claim 2, wherein, to activate a simulcast signal pathway between a particular one of the uplink antenna ports and two or more particular ones of the downlink antenna ports, the pathway scheduling controller is configured to activate the UPS output of the respective UPS that is coupled to one of the inputs of the combiner-divider network, and activate the DPS inputs of the respective DPS that are coupled to outputs of the combiner-divider network.

5. The bent-pipe satellite of claim 1, wherein the uplink antenna ports are gateway uplink antenna ports, and the downlink antenna ports are user downlink antenna ports, such that any activated monocast or simulcast signal pathways are forward-channel signal pathways.

6. The bent-pipe satellite of claim 1, wherein the uplink antenna ports are user uplink antenna ports, and the downlink antenna ports are gateway downlink antenna ports, such that any activated monocast or simulcast signal pathways are return-channel signal pathways, and wherein, to activate a simulcast return-channel signal pathway, the one or more sets of interconnected switches are further controllable to activate simulcast signal pathways between any two or more user uplink antenna ports and any gateway downlink antenna port, based on switching the input subsystems associated with the two or more user uplink antenna ports into connection with a respective input of the combiner-divider network and switching the output subsystem associated with the gateway downlink antenna port into connection with a respective output of the combiner-divider network.

7. The bent-pipe satellite of claim 1, wherein the uplink antenna ports comprise one or more gateway uplink antenna ports used for forward-channel traffic and one or more user uplink antenna ports used for return-channel traffic, the downlink antenna ports comprise one or more gateway downlink antenna ports used for return-channel traffic and one or more user downlink antenna ports used for forward-channel traffic, and wherein the one or more sets of interconnected switches is configured to provide selectively activated monocast and simulcast signal pathways for forward-channel traffic and selectively activated monocast and simulcast signal pathways for return-channel traffic.

8. The bent-pipe satellite of claim 7, wherein, for return-channel traffic, the one or more sets of interconnected switches are controllable to activate simulcast signal pathways between any two or more user uplink antenna ports and any gateway downlink antenna ports based on switching the input subsystems associated with the two or more user uplink antenna ports into connection with respective inputs of the combiner-divider network, and switching the output subsystem associated with the gateway downlink antenna port into connection with a corresponding output of the combiner-divider network.

9. The bent-pipe satellite of claim 1, wherein the bent-pipe satellite further includes channel filters comprised in the input or output subsystems.

10. The bent-pipe satellite of claim 1, wherein the bent-pipe satellite further comprises frequency converters comprised in the input or output subsystems, for converting between uplink-signal frequencies and downlink-signal frequencies.

11. The bent-pipe satellite of claim 1, wherein each input subsystem includes a low-noise amplifier in a signal path of the input subsystem.

12. The bent-pipe satellite of claim 1, wherein each output subsystem comprises a respective portion of a multiport amplifier having respective outputs coupled to the downlink antenna ports.

13. The bent-pipe satellite of claim 12, wherein the multiport amplifier comprises a plurality of power amplifiers coupled between a first butler matrix and a second butler matrix.

14. The bent-pipe satellite of claim 1, further comprising:
a memory, having stored thereon, the pathway selection schedule and a set of instructions, which, when executed by the pathway scheduling controller, cause the pathway scheduling controller to provide the control signals to the one or more sets of interconnected switches, according to the pathway selection schedule.

15. The bent-pipe satellite of claim 14, wherein the pathway selection schedule is updatable according to control information received from a ground terminal while the satellite is in orbit.

* * * * *